(12) United States Patent
Yoshida et al.

(10) Patent No.: US 7,216,482 B2
(45) Date of Patent: May 15, 2007

(54) CLUTCH DEVICE FOR A HYDROSTATIC CONTINUOUSLY VARIABLE TRANSMISSION

(75) Inventors: Yoshihiro Yoshida, Wako (JP);
Toshimasa Mitsubori, Wako (JP);
Takashi Ozeki, Wako (JP); Kazuhiko Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/081,891

(22) Filed: Mar. 11, 2005

(65) Prior Publication Data

US 2005/0202931 A1 Sep. 15, 2005

(30) Foreign Application Priority Data

Mar. 12, 2004 (JP) ............................. 2004-070331

(51) Int. Cl.
*F16D 31/02* (2006.01)

(52) U.S. Cl. ...................................................... 60/489
(58) Field of Classification Search ................... 60/489
See application file for complete search history.

(56) References Cited

U.S. PATENT DOCUMENTS 3,165,892 A * 1/1965 Roberts ....................... 60/489
3,364,679 A * 1/1968 Osojnak ....................... 60/489
3,704,588 A * 12/1972 Trabbic ....................... 60/489
5,353,595 A * 10/1994 Hayashi et al. ............... 60/489

FOREIGN PATENT DOCUMENTS

| JP | 6-42446 | 2/1994 |
|----|---------|--------|
| JP | 9-100909 | 4/1997 |
| JP | 2920772 | 4/1999 |

* cited by examiner

*Primary Examiner*—F. Daniel Lopez
(74) *Attorney, Agent, or Firm*—Hamre, Schumann, Mueller & Larson, PC

(57) ABSTRACT

In a hydrostatic continuously variable transmission, a hydraulic pump is linked to a hydraulic motor by a hydraulic closed circuit to change the capacity of the hydraulic motor so as to change the speed of a motorcycle continuously. A clutch device comprising a clutch valve for connecting and disconnecting a high pressure side oil passage and a low pressure side oil passage constituting the hydraulic closed circuit. A governor mechanism for generating governor force corresponding to the input rotation speed of the hydraulic pump and applying this governor force in the closing direction of the clutch valve. A spring for giving urging force in the opening direction of the clutch valve, and a buffer mechanism having a variable oil chamber and an oil pool chamber for easing the opening and closing movements of the clutch valve activated according to the governor force and the urging force.

12 Claims, 16 Drawing Sheets

CLUTCH DEVICE FOR A HYDROSTATIC CONTINUOUSLY VARIABLE TRANSMISSION

TECHNICAL FIELD

The present invention relates to a hydrostatic continuously variable transmission in which a hydraulic pump and a hydraulic motor are linked together by a hydraulic closed circuit, and the capacity of at least one of the hydraulic pump and the hydraulic motor is controlled to change the input rotation of the hydraulic pump and take it out as the output rotation of the hydraulic motor. More specifically, it relates to a clutch device for connecting and disconnecting a high pressure side oil passage and a low pressure side oil passage constituting the hydraulic closed circuit in this hydrostatic continuously variable transmission.

BACKGROUND OF THE INVENTION

Various types of hydrostatic continuously variable transmissions have been known and implemented. For example, patent document 1, patent document 2 and patent document 3 proposed by the present applicant disclose a hydrostatic continuously variable transmission. This hydrostatic continuously variable transmission disclosed by these patent documents comprises a cam plate type axial plunger pump, a cam plate type axial plunger motor, and a hydraulic closed circuit for connecting the outlet port and inlet port of the cam plate type axial plunger pump to the inlet port and outlet port of the cam plate type axial plunger motor, a pump cam plate member is driven by an engine, a pump cylinder and a motor cylinder are joined together and connected to an output shaft, and the rotation of a motor cam plate member is restricted, and the angle of the motor cam plate can be changed.

In the hydrostatic continuously variable transmission thus constituted, it has been known that a clutch valve for connecting and disconnecting a high pressure side oil passage and a low pressure side oil passage constituting the hydraulic closed circuit is installed to control the size of rotation drive force to be transmitted from the hydraulic pump to the hydraulic motor and to cut off the transmission of this rotation. For example, patent document 3 discloses an automatic clutch device which comprises this clutch valve. This clutch valve has a spring (urging means) for urging it in the opening direction and a hydraulic governor for generating governor oil pressure corresponding to the input engine speed and is opened or closed according to the urging force of the spring and the force of the governor (governor oil pressure) to connect or disconnect the high pressure side oil passage and the low pressure side oil passage.

[patent document 1] JP-A No. 42446/1994
[patent document 2] JP-A No. 2920772
[patent document 3] JP-A No. 100909/1997

In the above clutch valve, when the input engine speed is low (for example, when the engine idles), the urging force of the spring prevails and the clutch valve is opened (the clutch is disconnected) and when the input engine speed is high, the force of the governor prevails and the clutch valve is closed (the clutch is connected). However, at around an input engine speed at which the clutch valve moves in the opening direction, forces in the direction of disconnection and the direction of connection compete with each other. When force in the direction of disconnection grows all of the sudden by oil pressure due to the quick operation of a throttle, the clutch valve moves in the direction of disconnection in spite of an acceleration state, and the clutch is disconnected. Thereafter, the clutch valve moves in the direction of connection due to the force of the governor caused by an increase in engine speed, and the clutch is connected. That is, when the opening and closing operations of the clutch valve are repeated, it is difficult to transmit power stably.

SUMMARY OF THE INVENTION

In view of the above problem, it is an object of the present invention to provide a clutch device for a hydrostatic continuously variable transmission which can transmit power stably by ensuring the control of the opening and closing operations of the clutch valve.

Therefore, the hydrostatic continuously variable transmission according to the present invention is constituted such that a hydraulic pump and a hydraulic motor are linked together by a hydraulic closed circuit, and the capacity of at least one of the hydraulic pump and the hydraulic motor is controlled to change the input rotation of the hydraulic pump and take it out as the output rotation of the hydraulic motor. The clutch device of the hydrostatic continuously variable transmission comprises a clutch valve for connecting and disconnecting a high pressure side oil passage and a low pressure side oil passage constituting the hydraulic closed circuit to control the transmission of rotation from the hydraulic pump to the hydraulic motor, a governor mechanism for generating governor force corresponding to the input rotation speed of the hydraulic pump using centrifugal force generated by the input rotation of the hydraulic pump and applying this governor force in the closing direction of the clutch valve, urging means for giving urging force in the opening direction of the clutch valve, and a buffer mechanism for easing the opening and closing movements of the clutch valve activated according to the governor force and the urging force.

Preferably, the clutch valve is constituted such that a valve spool is movably arranged in a spool hole formed in the axial direction of a support shaft for supporting the hydraulic pump and the hydraulic motor rotatably so that the high pressure side oil passage and the low pressure side oil passage are connected or disconnected according to the movement of the valve spool in the spool hole; and the buffer mechanism has a variable oil chamber which is surrounded by the inner wall of the spool hole and the outer wall of the valve spool and whose capacity is changed by the movement of the valve spool and an oil pool chamber which is connected to the variable oil chamber and formed in the valve spool.

Preferably, an oil passage having an orifice connected to the oil pool chamber is formed in the valve spool to discharge oil in the oil pool chamber therethrough so as to provide resistance to a change in the capacity of the variable oil chamber and ease the movement of the valve spool. Further preferably, the oil passage is formed in the valve spool in such a manner that it is open to a connection portion for connecting the governor mechanism and the valve spool.

In the clutch device of the present invention, when forces in the direction of disconnection and the direction of connection applied to the clutch valve compete with each other, the movement of the clutch valve caused by a change in governor force corresponding to a sudden rise in oil pressure and a change in input rotation due to the quick operation of the throttle is eased by the buffer mechanism to become slow, whereby the opening and closing control of the clutch valve is made reliable to transmit the output rotation of the engine for driving the hydraulic pump to the hydraulic motor stably.

When the clutch valve is constituted such that the valves pool is movably arranged in the spool hole and the buffer mechanism has the variable oil chamber surrounded by the inner wall of the spool hole and the outer wall of the valve spool and the oil pool chamber connected to the variable oil chamber in the valve spool, the buffer mechanism is arranged compact in the clutch valve, thereby making it possible to make the clutch valve compact and the continuously variable transmission compact as well.

In this constitution, when the oil passage having an orifice connected to the oil pool chamber is formed in the valve spool to discharge oil in the oil pool chamber so as to give resistance to a change in the capacity of the variable oil chamber, the opening and closing movement of the valve spool can be made more reliable and can be eased effectively. When the formed oil passage is open to the connection portion between the governor mechanism and the valve spool, the connection portion can be lubricated with working oil discharged through the oil passage.

DETAILED DESCRIPTION OF THE INVENTION

Figure 2:
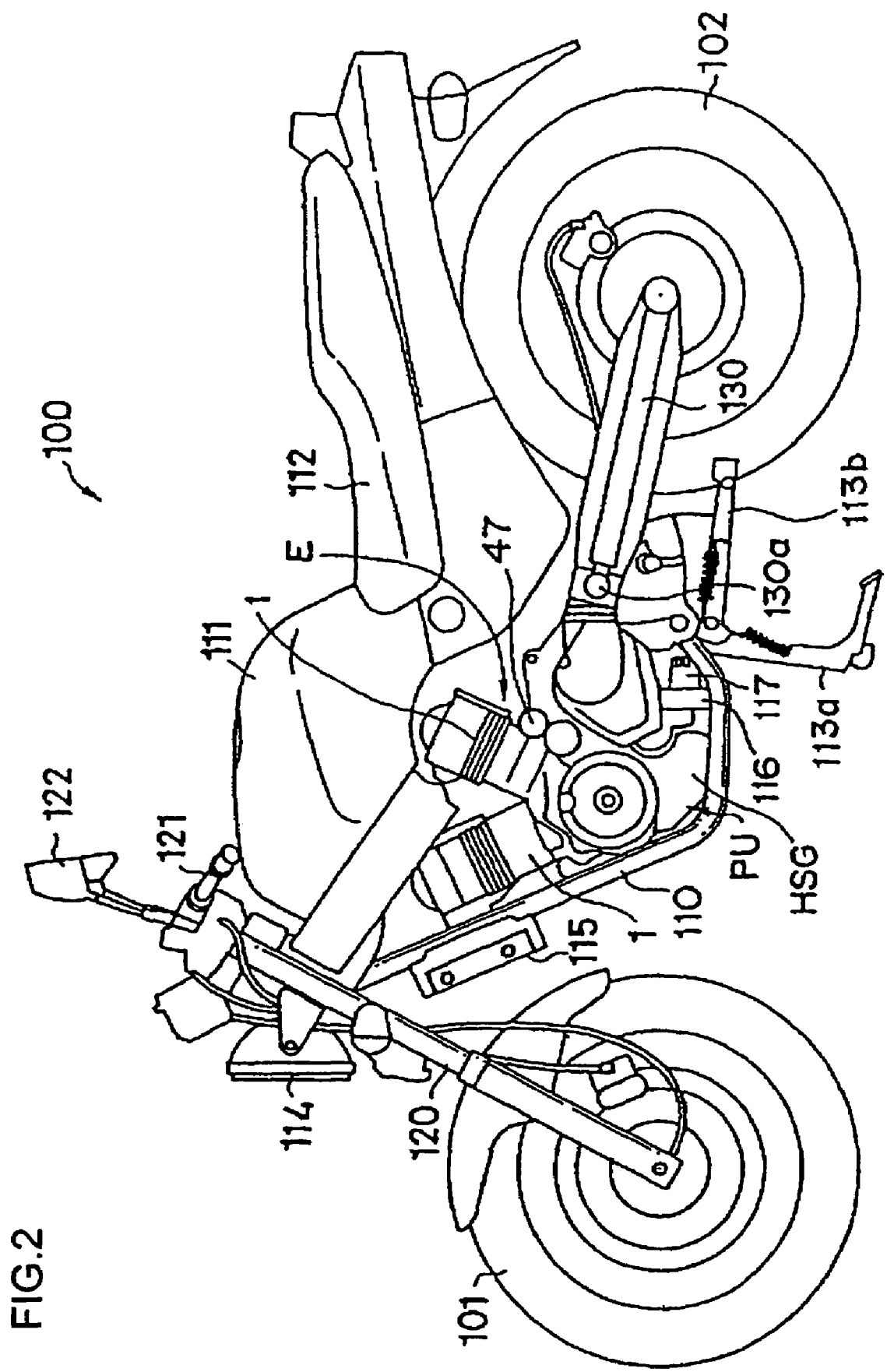
FIG. 2 is a diagram of a motorcycle having the above hydrostatic continuously variable transmission.

A preferred embodiment of the present invention will be described hereinunder with reference to the accompanying drawings. FIG. 2 shows the whole appearance of a motorcycle having the hydrostatic continuously variable transmission of the present invention. In FIG. 2, the internal structure of the motorcycle is exposed by removing part of the side cover member of the motorcycle. This motorcycle 100 comprises a main frame 110, a front fork 120 attached to the front end of the main frame 110 in such a manner that it can turn on the axis extending obliquely in the vertical direction, a front wheel 101 rotatably connected to the lower end of the front fork 110, a swing arm 130 pivotably connected to the rear of the main frame 110 with a shaft 130a as the center in such a manner that the swing arm 130 can swing in the vertical direction, and a rear wheel 102 rotatably connected to the rear end of the swing arm 130.

To the main frame 110 are mounted a fuel tank 111, a seat 112 for a rider, a main stand 113a and a sub-stand 113b for holding the body upright when it stops, a head light 114 for illuminating the forward direction when the motorcycle runs at night, a radiator 115 for cooling engine cooling water and a power unit PU for generating rotation drive force for driving the rear wheel 102, etc. A handlebar (steering handlebar) 121 operated by the rider, a rear view mirror 122 for obtaining a rear view, etc. are attached to the front fork 120. In the swing arm 130, there is installed a drive shaft for transmitting rotation drive force generated from the power unit PU to the rear wheel as will be described hereinafter.

Figure 3:
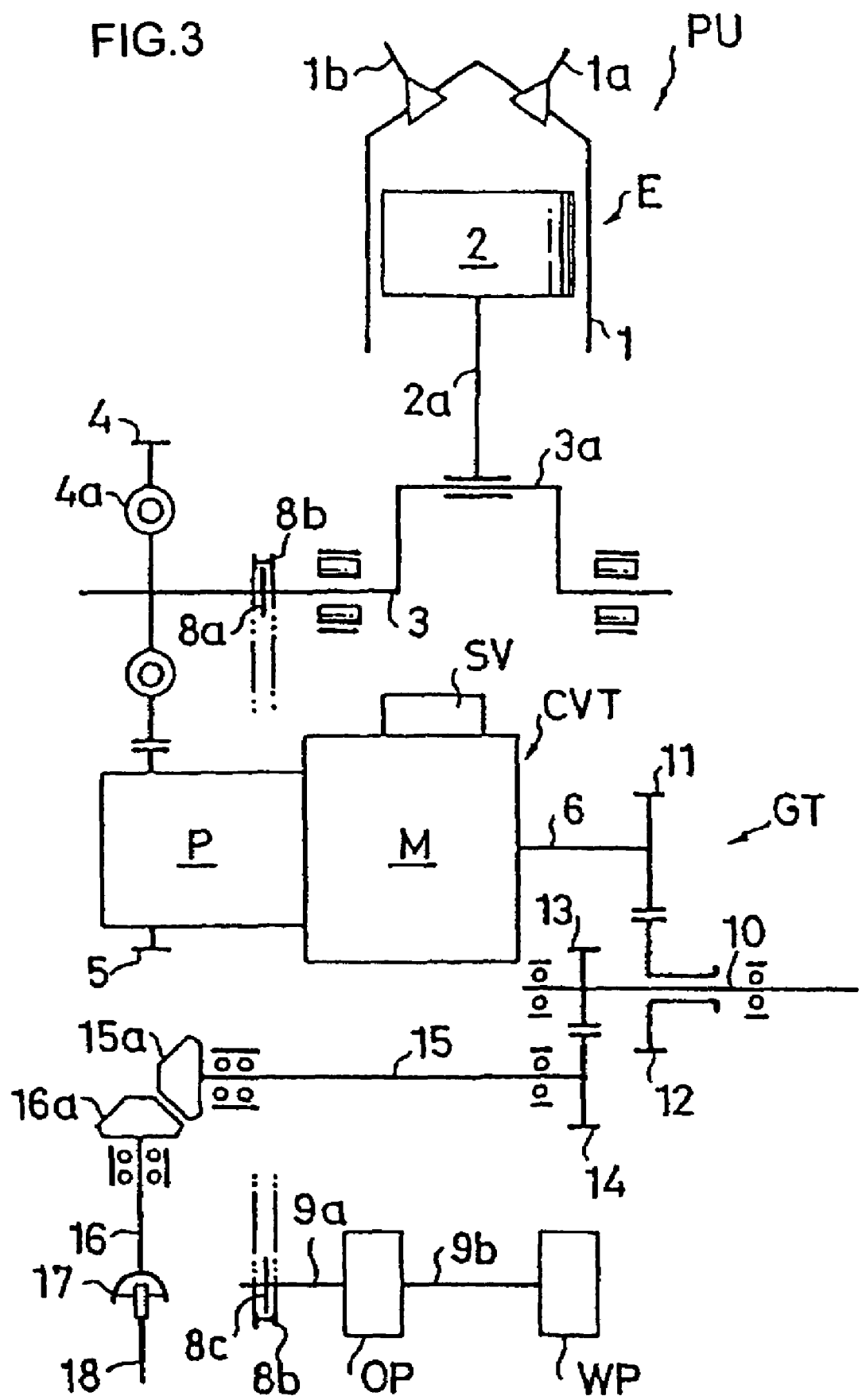
FIG. 3 is a diagram showing the power transmission channel of a power unit having the above hydrostatic continuously variable transmission.
Figure 4:
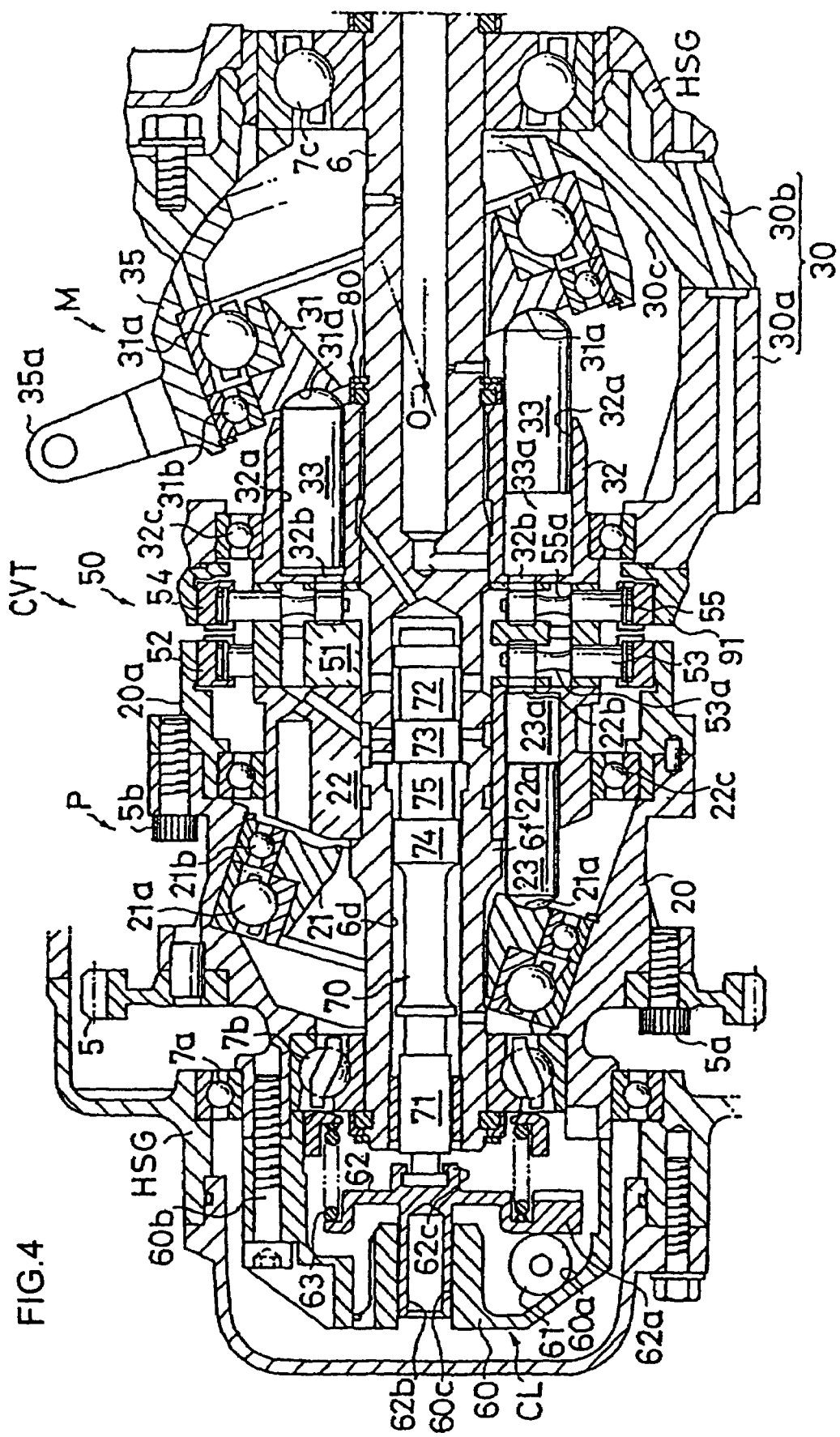
FIG. 4 is a sectional view showing the above hydrostatic continuously variable transmission.

In this motorcycle 100, the hydrostatic continuously variable transmission CVT of the present invention is used in the power unit PU which will be described hereinunder. FIG. 3 shows the schematic constitution of the power unit PU which comprises an engine E for generating rotation drive force, the hydrostatic continuously variable transmission CVT for changing the output rotation of the engine continuously, and a transmission gear train GT for changing the direction and transmitting the output rotation of this hydrostatic continuously variable transmission CVT.

As shown in FIG. 2, the engine E is a V-type air cylinder engine having a V bank and a cylinder 1 which extends upward and obliquely in the horizontal direction like letter V. This engine E is constituted such that a piston 2 is installed in the cylinder 1 having intake and exhaust valves 1a and 1b. In the engine E, the intake valve 1a and the exhaust valve 1b are opened and closed at a predetermined timing, an air-fuel mixture is burnt in the cylinder 1 to reciprocate the piston 2, and this reciprocation of the piston 2 is transmitted to a crank unit 3a by a connection rod 2a to drive a crank shaft 3. An input drive gear 4 having a damper 4a is attached to the end of the crank shaft 3 so that the rotation drive force of the crank shaft 3 is transmitted to the input drive gear 4.

A drive sprocket 8a is fitted onto the crank shaft 3 so that rotation drive force is transmitted to a slave sprocket 8c fitted onto pump drive shafts 9a and 9b by a chain 8b. An oil pump OP and a water pump WP are connected to the pump drive shafts 9a and 9b as shown in the figure and driven by the engine E. Working oil discharged from the oil pump OP is supplied as oil for replenishment or lubricating oil for the hydrostatic continuously variable transmission CVT as will be described hereinafter. As shown in FIG. 2, the working oil is cooled by an oil cooler 116 arranged at the lower rear of the power unit PU and filtered by an oil filter 117. Cooling water discharged from the water pump WP is used to cool the engine E and the cooling water heated by the engine E is cooled by the radiator 115.

The hydrostatic continuously variable transmission CVT comprises a cam plate plunger type hydraulic pump P and a cam plate plunger type hydraulic motor M. An input slave gear 5 connected to a pump casing constituting the cam plate plunger type hydraulic pump P is engaged with the above input drive gear 4 so that the rotation drive force of the engine E is transmitted to the input slave gear 5 to drive the pump casing. The hydraulic pump P is of a fixed capacity type having a predetermined cam plate angle, and the hydraulic motor M is of a variable capacity type having a variable cam plate angle and has a motor servo mechanism SV for changing the angle of the motor cam plate. The output rotation changed continuously by the hydrostatic continuously variable transmission CVT whose detailed description will be given hereinafter is output to a transmission output shaft 6.

The transmission output shaft 6 is connected to the transmission gear train GT so that the rotation of the transmission output shaft 6 is changed to an advance state, a neutral state or speed reduction by means of the gear train GT. The transmission gear train GT comprises a counter shaft 10 and a first output drive shaft 15 extending parallel to the transmission output shaft 6, and further has a first gear 11 connected to the transmission output shaft 6, a second gear 12 which turns together with the counter shaft 10 and freely moves in the axial direction of the counter shaft 10, a third gear 13 connected to the counter shaft 10 and a fourth gear 14 which is always engaged with the third gear 13 and connected to the first output drive shaft 15. The second gear 12 is moved in the axial direction over the counter shaft 10 in accordance with the change operation of the rider to be engaged with the first gear 11 for the advance state and disengaged from the first gear 11 for the neutral state.

Meanwhile, an output drive bevel gear 15a is attached to the end of the first output shaft 15 so that rotation drive force is transmitted from an output slave bevel gear 16a which is engaged with this output drive-bevel gear 15a to a second output drive shaft 16. This second output drive shaft 16 is connected to a drive shaft 18 by a universal joint 17 and the drive shaft 18 is connected to the rear wheel 102 through the inside of the swing arm 130 as described above so that rotation drive force is transmitted to the rear wheel 102 to drive it. The universal joint 18 is coaxial to the shaft 130a relative to the main frame 110 of the swing arm 130.

A description is subsequently given of the above hydrostatic continuously variable transmission CVT with reference to FIG. 1 and FIGS. 4 to 6. The hydrostatic continuously variable transmission CVT has the cam plate plunger type hydraulic pump P and the cam plate plunger type hydraulic motor M, and the transmission output shaft 6 extends through the center of the continuously variable transmission CVT. The transmission output shaft 6 is rotatably supported to a transmission housing HSG by ball bearings 7a, 7b and 7c.

The hydraulic pump P comprises a pump casing 20 mounted on the transmission output shaft 6 in such a manner that it is coaxial to the transmission output shaft 6 and rotatable relative to the shaft 6, a pump cam plate member 21 arranged in the pump casing 20 and inclined at a predetermined angle from the neutral axis of rotation of the pump casing 20, a pump cylinder 22 opposed to the pump cam plate member 21, and a plurality of pump plungers 23 which are installed in a plurality of pump plunger holes 22a arranged in a loop around the neutral axis of the pump cylinder 22 and extending in the axial direction in such a manner that they can freely slide in the holes 22a. The pump casing 20 is rotatably supported on the transmission output shaft 6 and the pump cylinder 22 by bearings 7b and 22c and also rotatably supported to the transmission housing HSG by a bearing 7a. The pump cam plate member 21 is arranged on the pump casing 20 in such a manner that it can be rotated round the axis inclined at the above predetermined angle by bearings 21a and 21b. That is, the pump cylinder 22 is supported to the pump casing 20 by the bearing 22c in such a manner that it is coaxial to the pump casing 20 and rotatable relative to the pump casing 20.

The input slave gear 5 is attached to the outer wall of the pump casing 20 by fastening a bolt 5a. The outer ends of the pump plungers 23 project outward, contact and engage with the cam plate face 21a of the pump cam plate member 21, and the inner ends situated in the pump plunger holes 22a of the pump plungers 23 are opposed to the valve body 51 of a distribution valve 50 which will be described hereinafter to form pump oil chambers 23a in the pump plunger holes 22a. A pump opening 22a which serves as a pump outlet port and inlet port is formed in the ends of the pump plunger holes 22a. When the input slave gear 5 is driven to turn as described above, the pump casing 20 turns, the pump cam plate member 21 arranged in the pump casing 20 is moved by the rotation of the pump casing 20, and the pump plungers 23 are reciprocated in the pump plunger holes 22a by the movement of the cam plate face 21a to discharge working oil from the pump oil chambers 23a or suck working oil into the pump oil chambers 23a.

A pump eccentric member 20a is connected to the right end in the figure of the pump casing 20 by a bolt 5b. The inner wall 20b of this pump eccentric member 20a is formed cylindrical and eccentric from the rotation axis of the pump casing 20. Since the pump eccentric member 20 having the eccentric inner wall 20b is a separate unit from the pump casing 20, it is easily manufactured.

The hydraulic motor M comprises: a motor casing 30 (consisting of a plurality of casings 30a and 30b) connected to the transmission housing HSG to be fixed and held; a motor moving member 35 which is supported to a support spherical face 30c formed on the inner face of the motor casing 30 (casing 30b) in such a manner that it is in slide contact with the support spherical face 30c and moves round the center O extending in a direction perpendicular (direction perpendicular to the sheet) to the neutral axis of the transmission output shaft 6; a motor cam plate member 31 which is installed in the motor moving member 35 and rotatably supported by bearings 31a and 31b; a motor cylinder 32 opposed to the motor cam plate member 31; and a plurality of motor plungers 33 slidably installed in a plurality of motor plunger holes 32a arranged in a loop around the neutral axis of the motor cylinder 32 and extending in the axial direction. The outer wall of the motor cylinder 32 is rotatably supported to the motor casing 30 by a bearing 32c.

Figure 15:
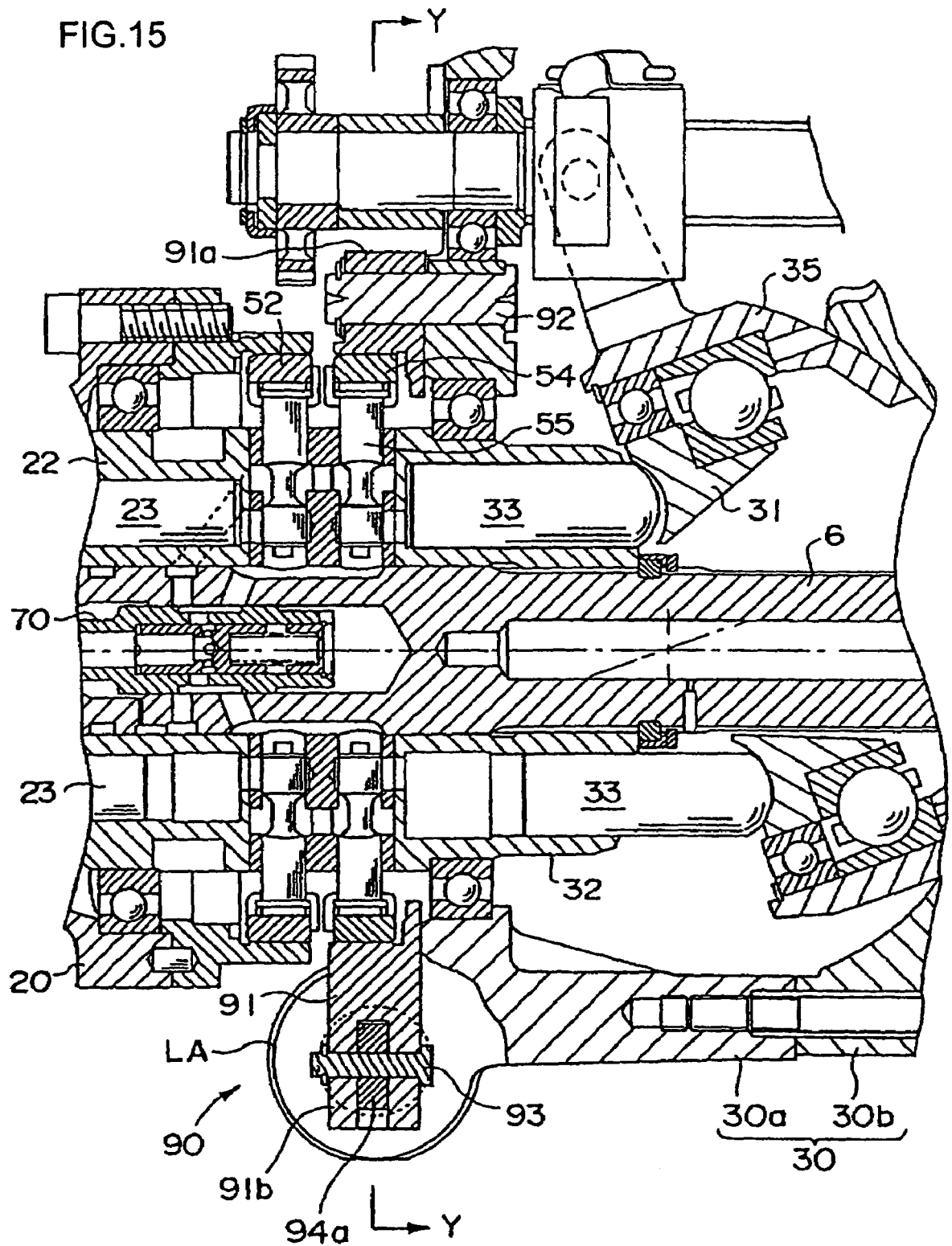
FIG. 15 is a sectional view showing the structure of a lock-up mechanism in the above hydrostatic continuously variable transmission.

The hydraulic motor M is provided with a lock-up mechanism 90 situated at the left end of the motor casing 30 in the figures (FIGS. 15 to 17), and a motor eccentric member 91 constituting this lock-up mechanism 90 is in slide contact with the end of the motor casing 30a. The lock-up mechanism 90 will be described hereinafter. A cylindrical inner wall 91a formed on the motor eccentric member 91 is moved between a lock-up position where the motor eccentric member 91 becomes coaxial to the motor cylinder 32 and an ordinary position where the motor eccentric member 91 becomes eccentric from the rotation axis of the motor cylinder 32.

The outer ends of the motor plungers 33 project outward, are secured in contact with the cam plate face 31a of the motor cam plate member 31, and the inner ends in the plunger holes 32a of the motor plungers 33 are opposed to the valve body 51 to form motor oil chambers 33a in the motor plunger holes 32a. A motor opening 32b which serves as motor outlet port and inlet port is formed in the ends of the motor plunger holes 32a. An arm portion 35a projecting from the end of the motor moving member 35 projects outward in the radial direction and is connected to the motor servo mechanism to be moved in right and left directions in FIG. 1, thereby moving the motor moving member 35 round the center O. When the motor moving member 35 is moved, the motor cam plate member 31 rotatably supported in the motor moving member 35 is also moved with the result that its cam plate angle is changed.

Figure 5:
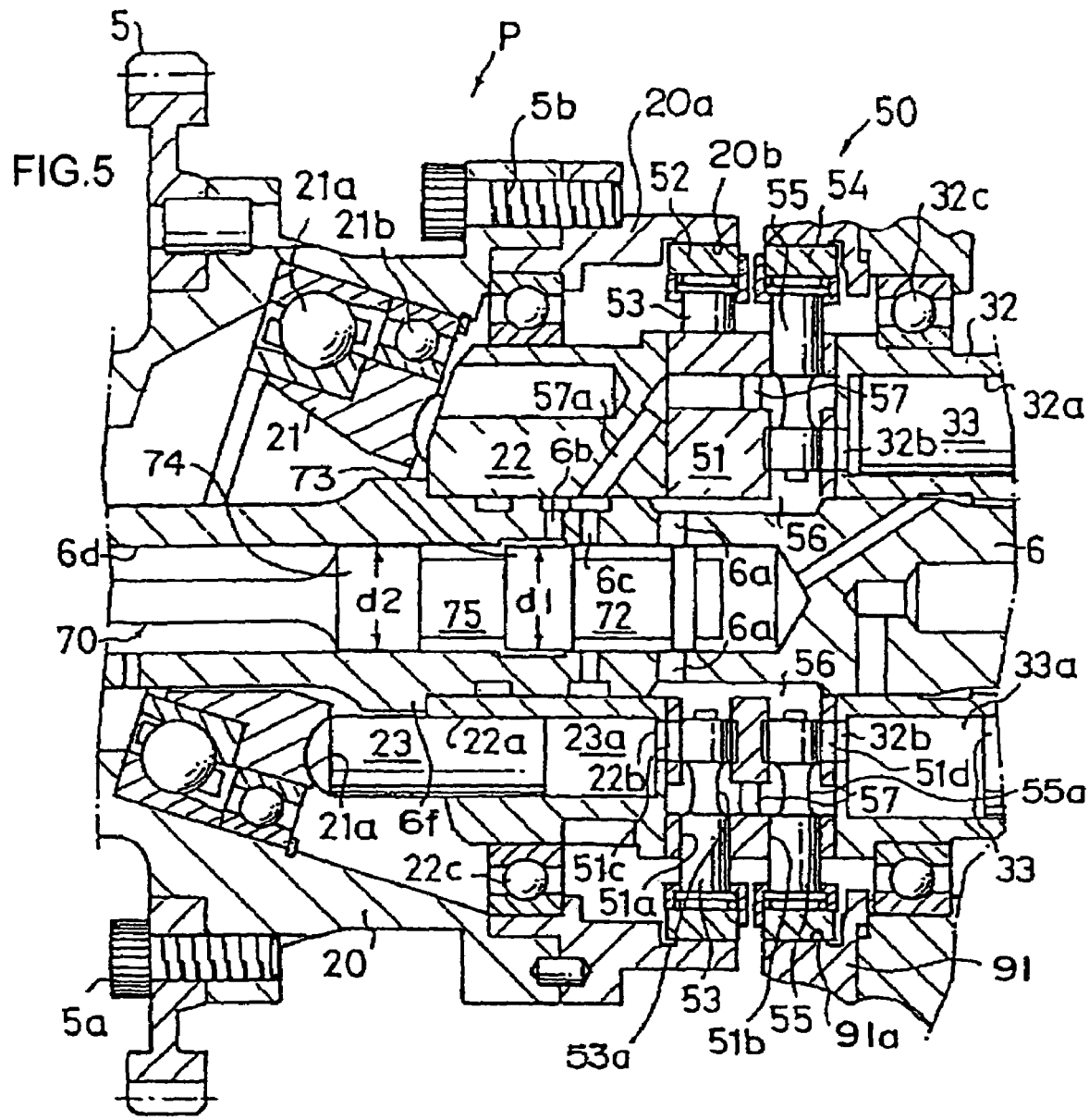
FIG. 5 is an enlarged sectional view of part of the above hydrostatic continuously variable transmission.
Figure 6:
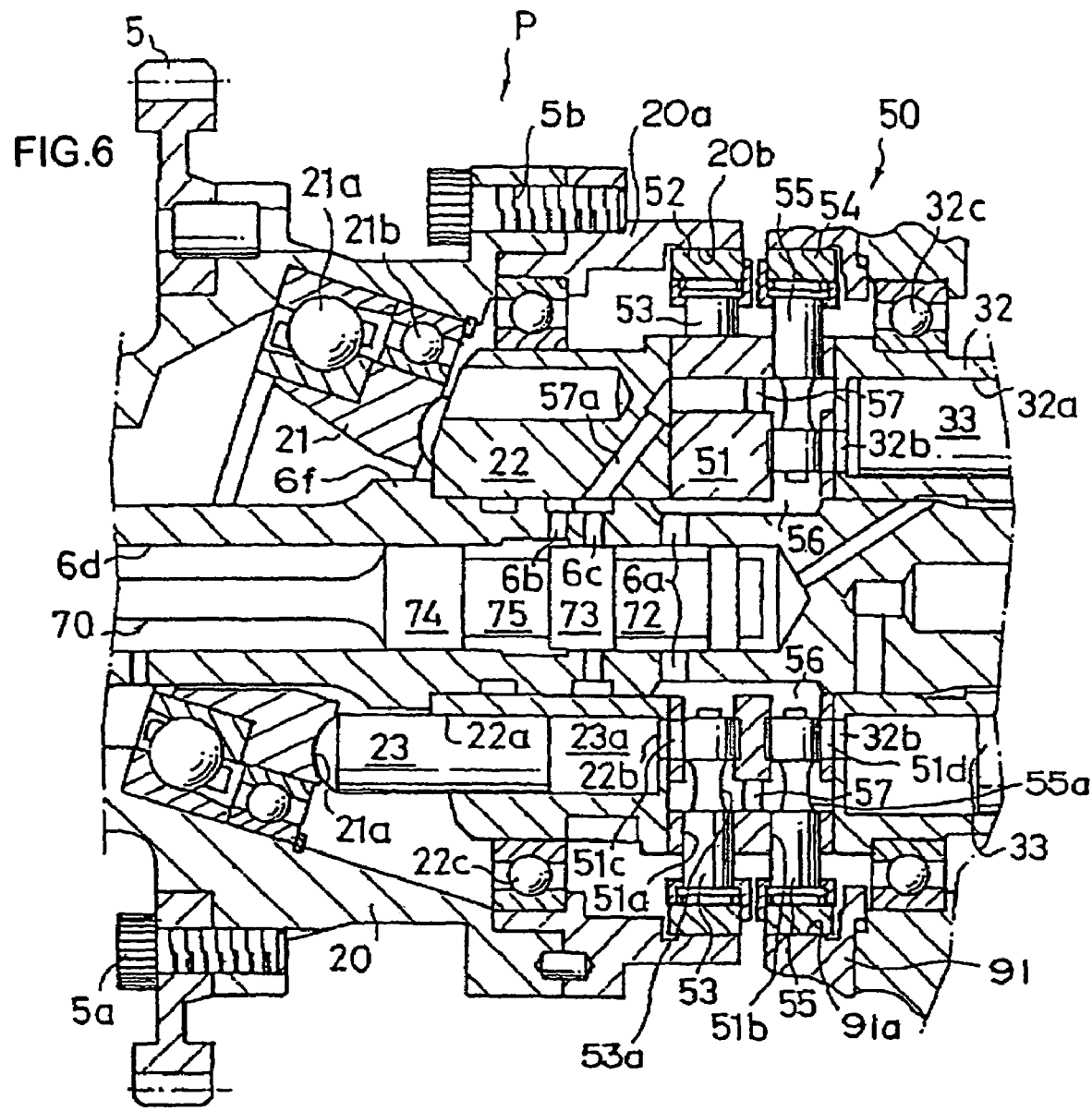
FIG. 6 is an enlarged sectional view of part of the above hydrostatic continuously variable transmission.

The distribution valve 50 is interposed between the pump cylinder 22 and the motor cylinder 32. FIG. 5 and FIG. 6 are enlarged views of the distribution valve 50. The valve body 51 of the distribution valve 50 is sandwiched between the pump cylinder 22 and the motor cylinder 32 and soldered to these cylinders as an integrated unit, and the motor cylinder 32 is spline connected to the transmission output shaft 6. Therefore, the pump cylinder 22, the distribution valve 50, the motor cylinder 32 and the transmission output shaft 6 turn together.

The pump cylinder 22, the distribution valve 50 (valve body 51) and the motor cylinder 32 which are linked together as an integrated unit are referred to as "output rotor" and a structure for installing this output rotor on the transmission output shaft 6 at a predetermined position in the axial direction will be described hereinbelow. A restriction portion 6f projecting outward like a flange is formed on the transmission output shaft 6 for the above positioning, and the left end face of the pump cylinder 22 is abutted against the restricting portion 6f to position the output rotor in the left direction. Meanwhile, a securing member 80 is mounted on the transmission output shaft 6 in such a manner that it is opposed to the right end face of the motor cylinder 32 for positioning the output rotor in the right direction.

Figure 7A:
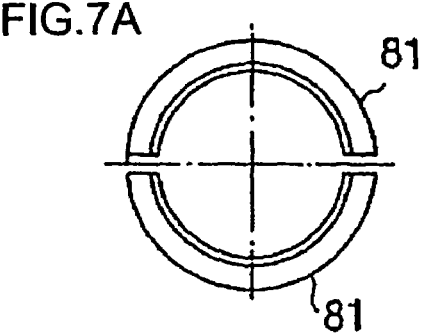
FIG. 7 is a front view and a sectional view of cotter members used for positioning a rotor in the above hydrostatic continuously variable transmission.
Figure 7B:
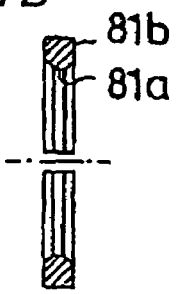
Figure 8A:
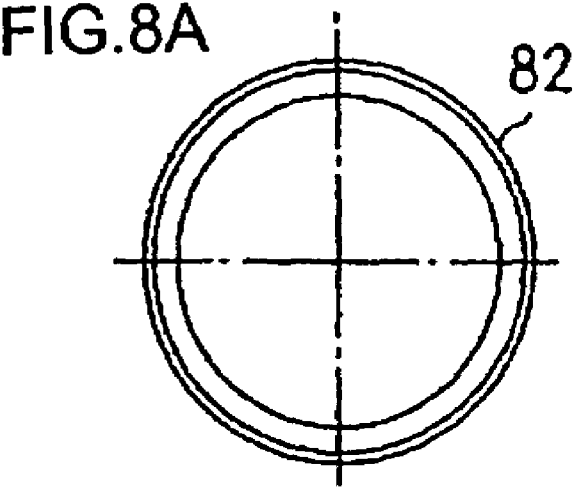
FIG. 8 is a front view and a sectional view of a retainer ring used for positioning the rotor in the above hydrostatic continuously variable transmission.
Figure 8B:
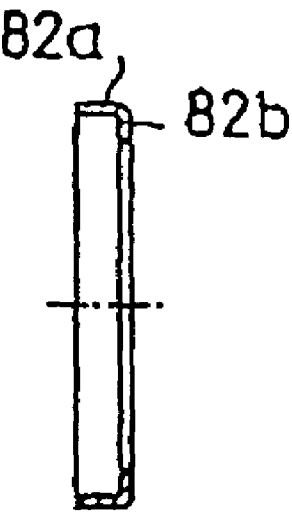
Figure 9A:
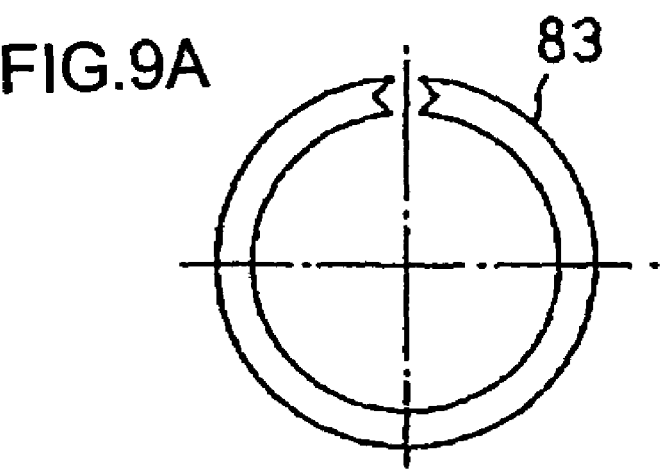
FIG. 9 is a front view and a sectional view of a circlip used for positioning the rotor in the above hydrostatic continuously variable transmission.
Figure 9B:
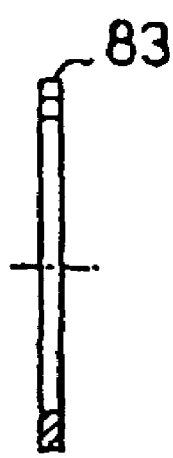
Figure 12:
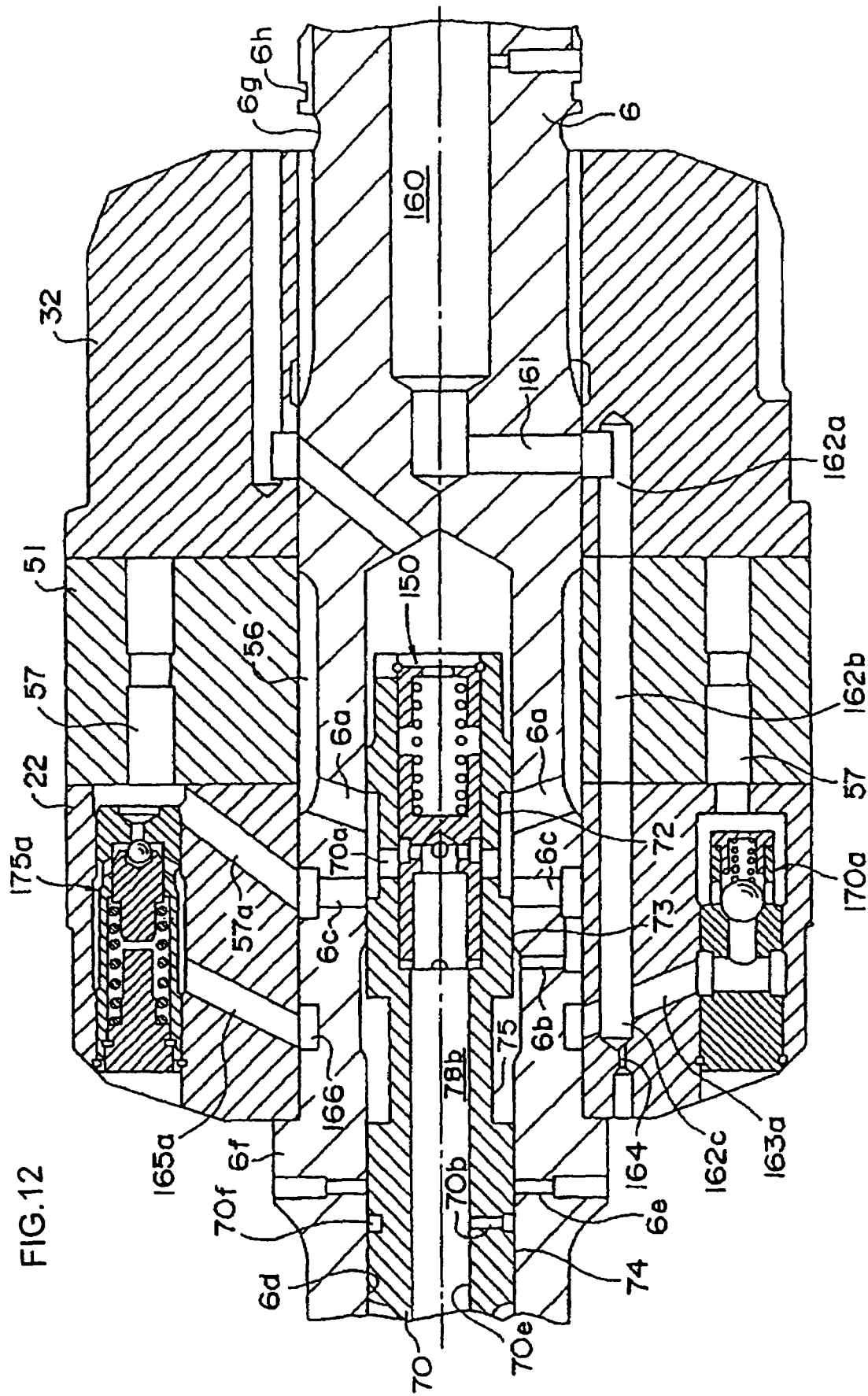
FIG. 12 is a sectional view showing the structures of a transmission output shaft and an output rotor in the above hydrostatic continuously variable transmission.
Figure 13:
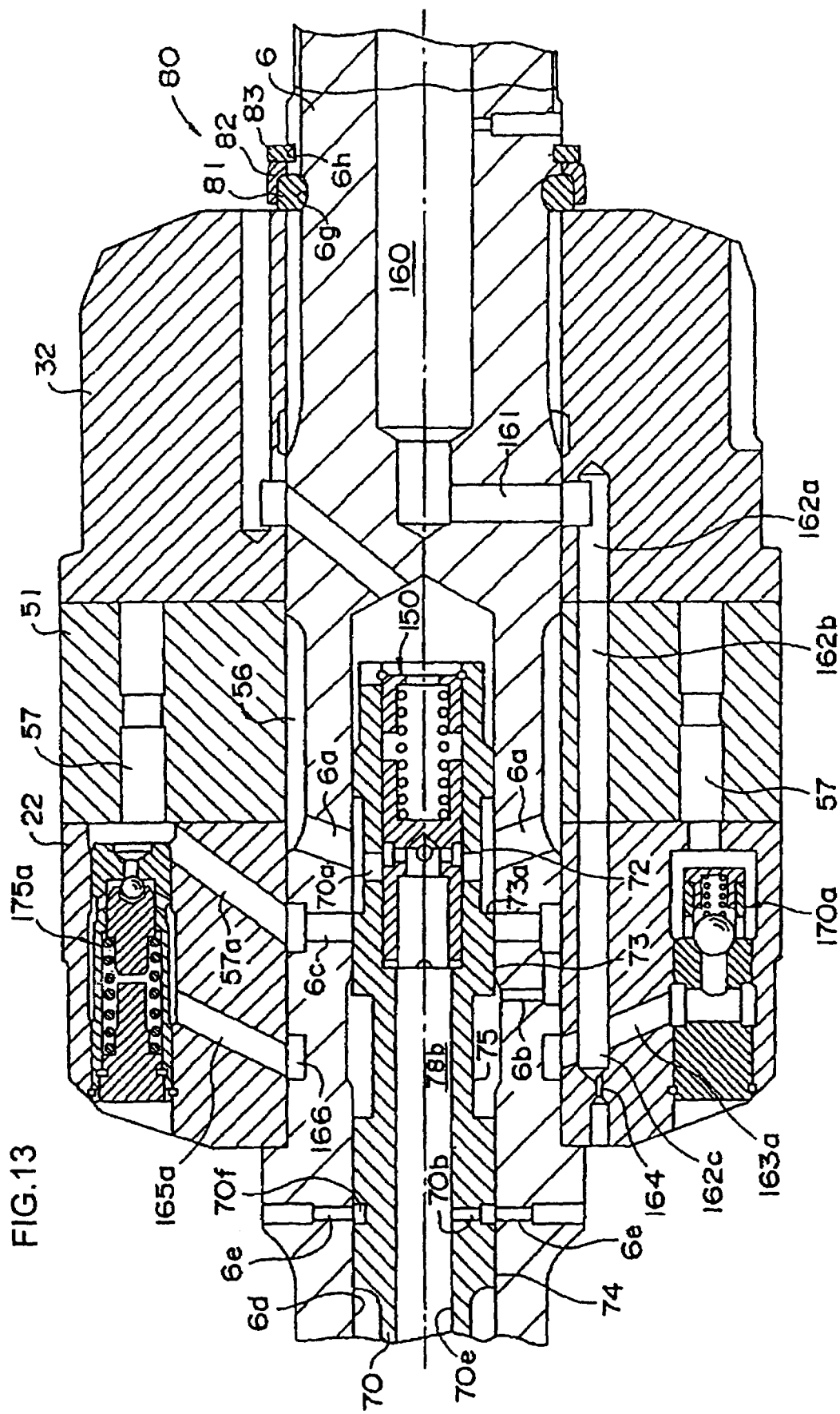
FIG. 13 is a sectional view showing the structures of the transmission output shaft and the output rotor in the above hydrostatic continuously variable transmission.
Figure 14:
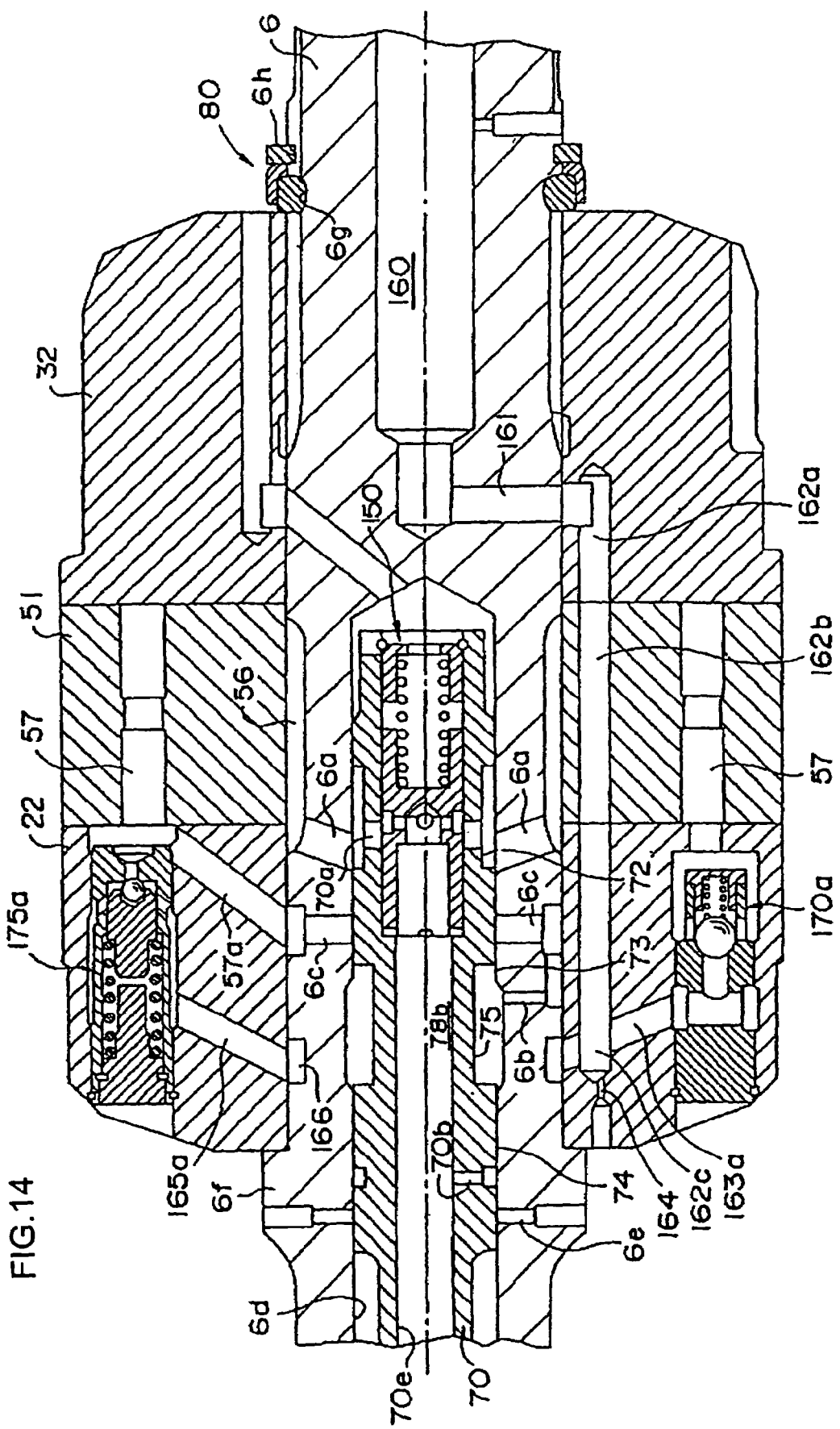
FIG. 14 is a sectional view showing the structures of the transmission output shaft and the output rotor in the above hydrostatic continuously variable transmission.

As shown in details in FIGS. 12 to 14, to install the securing member 80, an annular first securing groove 6g and an annular second securing groove 6h are formed in the transmission output shaft 6. The inner walls 81a of a pair of cotter members 81 formed semicircular as shown in FIG. 7 are fitted in the first securing groove 6g. A retainer ring 82 shown in FIG. 8 is fitted onto the pair of cotter members 81 in such a manner that the side portion 82b of the retainer ring 82 comes into contact with the side portions of the cotter members 81 and the outer wall portion 82a covers the outer walls 81b of the cotter members 81 to hold the cotter members 81 as they are. Further, a circlip 83 shown in FIG. 9 is fitted in the second securing groove 6h to hold the retainer ring 82 in this state. As a result, the right end face of the motor cylinder 32 comes into contact with the securing member 80 to position the output rotor in the right direction. As understood from the above constitution, the output rotor is sandwiched between the restricting portion 6f and the securing member 80 to be positioned on the transmission output shaft 6.

A description is subsequently given of the distribution valve 50. As clearly shown in FIG. 5 and FIG. 6 in particular, a plurality of pump side spool holes 51a and a plurality of motor side spool holes 51b are formed in the valve body 51 constituting the distribution valve 50 in two rows at equal intervals in the circumferential direction and extend in the radial direction. Pump side spools 53 and motor side spools 55 are slidably fitted in the pump side spool holes 51a and the motor side spool holes 51b, respectively.

The pump side spool holes 51a are formed corresponding to the pump plunger holes 22a, and pump openings 22b (pump oil chambers 23a) corresponding to the pump side spool holes 51a and a plurality of pump side communication passages 51c communicating with the pump side spool holes 51a are formed in the valve body 51. The motor side spool holes 51b are formed corresponding to the motor plunger holes 32a, and a plurality of motor side communication passages 51d communicating with the motor openings 32b (motor oil chambers 33a) corresponding to the motor plunger holes 32a, and the motor side spool holes 51b are formed in the valve body 51.

In the distribution valve 50, a pump side cam ring 52 is arranged around the outer end portions of the pump side spools 53, and a motor side camp ring 54 is arranged around the outer end portions of the motor side spools 55. The pump side cam ring 52 is installed on the inner wall 20b formed eccentric from the rotation neutral axis of the pump casing 20 on the inner wall of the pump eccentric member 20a connected to the end of the pump casing 20 by the bolt 5b and rotatably supported to the pump casing 20. The motor side cam ring 54 is installed on the inner wall 91a of the motor eccentric member 91 in slide contact with the end of the motor casing 30. The outer ends of the pump side spools 53 are secured to the inner wall of the pump side cam ring 52 in such a manner that they can turn relatively, and the outer ends of the motor side spools 55 are secured to the inner wall of the motor side cam ring 54 in such a manner that they can turn relatively.

An inner passage 56 is formed between the inner wall of the valve body 51 and the outer wall of the transmission output shaft 6, and the inner end portions of the pump side spool holes 51a and the motor side spool holes 51b communicate with the inner passage 56. An outer passage 57 which communicates with the pump side spool holes 51a and the motor side spool holes 51b is formed in the valve body 51.

The operation of the distribution valve 50 constituted as described above will be described hereinbelow. When the drive force of the engine E is transmitted to the input slave gear 5 and the pump casing 20 is driven to turn, the pump cam plate member 21 is moved by this rotation. Therefore, the pump plungers 23 which are secured in contact with the cam plate face 21a of the pump cam plate member 21 are reciprocated in the axial direction in the pump plunger holes 22a by the movement of the pump cam plate member 21, whereby working oil is discharged from the pump oil chambers 23a through the pump openings 22b by the inward movement of the pump plungers 23 and sucked into the pump chambers 23a through the pump openings 22b by the outward movement of the pump plungers 23.

Although the pump side cam ring 52 installed on the inner wall 20b of the pump eccentric member 20a connected to the end of the pump casing 20 is turned together with the pump casing 20 at this point, as the pump side cam ring 52 is eccentric from the center of rotation of the pump casing 20, the pump side spools 53 are reciprocated in the pump side spool holes 51a in the radial direction by the rotation of the pump side cam ring 52. When the pump side spools 53 are reciprocated and moved inward from the state shown in FIG. 5 and FIG. 6, the pump side communication passages 51c and the outer passage 57 communicate with each other through spool grooves 53a and when the pump side spools 53 are moved outward from the state shown in FIG. 5 and FIG. 6, the pump side passages 51c and the inner passage 56 communicate with each other.

Even when the cain plate member 21 moved by the rotation of the pump casing 20, as the pump plungers 23 arc reciprocated between a position where they are forced out to the outermost side (to be referred to as "bottom dead center") and a position where they are forced in to the innermost side (to be referred to as "top dead center"), the pump side cam ring 52 reciprocates die pump side spools 53 in the radial direction. As a result, the pump plungers 23 move from the bottom dead center to the top dead center by the rotation of the pump easing 20 and working oil in the pump oil chambers 23a is discharged from the pump openings 22b and supplied into the outer passage 57 through the pump side communication passages 51c. When the pump plungers 23 are moved from the top dead center to the bottom dead center by the rotation of the pump casing 20, working oil contained in the inner passage 56 is sucked into the pump oil chambers 23a through the pump side communication passages 51c and the pump openings 22b. As understood from this, when the pump casing 20 is driven to turn, working oil discharged from the hydraulic pump P is supplied into the outer passage 57 and sucked into the hydraulic pump P from the inner passage 56.

The motor side cam ring 54 which is installed on the inner wall 91a of the motor eccentric member 91 in slide contact with the end of the motor casing 30 is eccentric from the center of rotation of the motor cylinder 32 (output rotor and transmission output shaft 6) when the motor eccentric member 91 is moved to a normal position. Therefore, when the motor cylinder 32 is turned, the motor side spools 55 are reciprocated in the motor side spool holes 51b in the radial direction by the rotation of the motor cylinder 32. When the motor side spools 55 are reciprocated and moved inward from the state shown in FIG. 5 and FIG. 6, the motor side communication passages 51d and the outer passage 57 communicate with each other through the spool grooves 55a and when the motor side spools 55 are moved outward from the state shown in FIG. 5 and FIG. 6, the motor side passages 51d and the inner passage 56 communicate with each other. A case where the motor eccentric member 91 is moved to a lock-up position will be described hereinafter and a case where it is moved to a normal position will be described hereinbelow.

Figure 1:
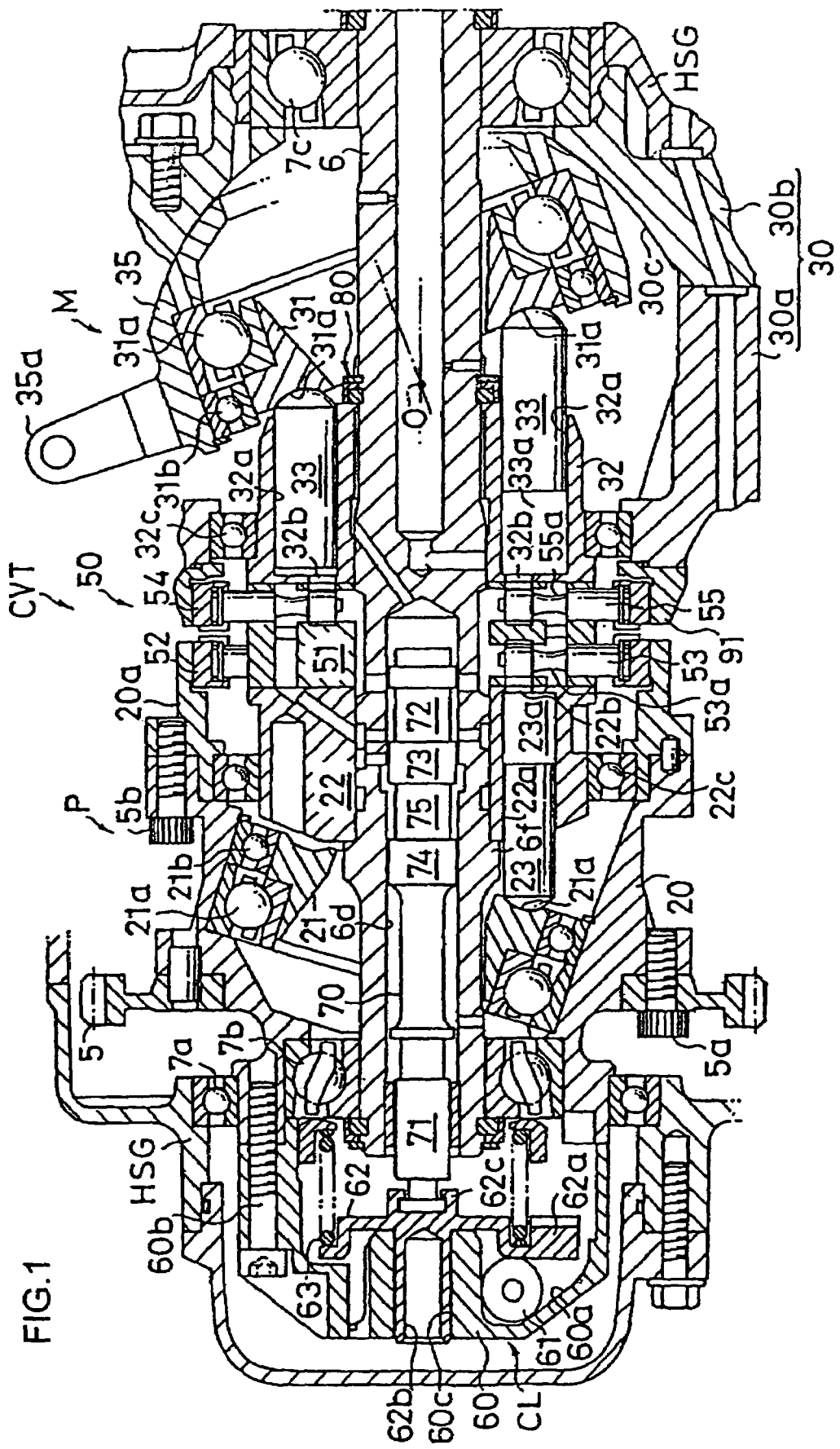
FIG. 1 is a sectional view showing a hydrostatic continuously variable transmission having a clutch device according to the present invention.

Working oil discharged by the hydraulic pump P is supplied into the outer passage 57 as described above and further into the motor oil chambers 33a from the motor side communication passages 51d through the motor openings 32b, whereby the motor plungers 33 are pushed outward in the axial direction. The outer end portions of the motor plungers 33 which receive outward pressure in the axial direction are brought into slide contact with a section from the top dead center to the bottom dead center of the motor cam plate member 31 when the motor moving member 35 is moved as shown in FIG. 1 and the motor cylinder 32 is driven to turn so that the motor plungers 33 are moved from the top dead center to the bottom dead center along the motor cam plate member 31 by this outward pressure in the axial direction.

In order to drive the motor cylinder 32, the motor side cam ring 54 reciprocates the motor side spools 55 in the radial direction along with the reciprocation of the motor plungers 33 between the position where they are forced out to the outermost side (bottom dead center) to the position where they are forced in to the innermost side (top dead center) by the rotation of the motor cylinder 32. When the motor cylinder 32 is driven to turn, the motor plungers 33 are forced inward while they are moved from the bottom dead center to the top dead center along the motor cam plate member 31 by this rotation, and working oil contained in the motor oil chambers 33a is supplied into the inner passage 56 from the motor openings 32b through the motor side communication passages 51d. The working oil supplied into the inner passage 56 is sucked into the pump oil chambers 23a through the pump side communication passages 51c and the pump openings 22b.

As understood from above, when the pump casing 20 is driven to turn by the rotation drive force of the engine E, working oil is discharge from the hydraulic pump P to the outer passage 57 and supplied into the hydraulic motor M to drive the motor cylinder 32. Working oil which has driven the motor cylinder 32 is supplied into the inner passage 56 and sucked into the hydraulic pump P from the inner passage 56. The hydraulic closed circuit for linking the hydraulic pump P and the hydraulic motor M is constituted by the distribution valve 50, working oil discharged from the hydraulic pump P by the rotation of the hydraulic pump P is supplied into the hydraulic motor M through the hydraulic closed circuit to drive the hydraulic motor M, and further working oil discharged by driving the hydraulic motor M is returned into the hydraulic pump P through the hydraulic closed circuit.

In this case, when the hydraulic pump P is driven by the engine E and the rotation drive force of the hydraulic motor M is transmitted to the wheels to drive the vehicle, the outer passage 57 becomes a high pressure side oil passage and the inner passage 56 becomes a low pressure side oil passage. On the other hand, when the drive force of the wheels is transmitted to the hydraulic motor M and the rotation drive force of the hydraulic pump P is transmitted to the engine E to produce an engine braking function as in the case of driving on a descending slope, the inner passage 56 becomes a high pressure side oil passage and the outer passage 57 becomes a low pressure side oil passage.

Since the pump cylinder 22 and the motor cylinder 32 are connected to the transmission output shaft 6 and turn together at this point, when the motor cylinder 32 is driven to turn, the pump cylinder 22 also turns together and the relative rotation speeds of the pump casing 20 and the pump cylinder 22 become low. Therefore, the relationship between the rotation speed Ni of the pump casing 20 and the rotation speed No of the transmission output shaft 6 (that is, the rotation speeds of the pump cylinder 22 and the motor cylinder 32) is expressed by the following equation (1) based on the capacity Vp of the pump and the capacity Vm of the motor.

$$Vp \cdot (Ni - No) = Vm \cdot No \tag{1}$$

The motor capacity Vm can be changed continuously by moving the motor moving member 35 by means of the motor servo mechanism SV. That is, in the above expression (1), when the rotation speed Ni of the pump cam plate member 21 is fixed and the motor capacity Vm is changed continuously, the rotation of the transmission output shaft 6 changes continuously. It is understood from this that the motor moving member 35 is moved by the motor servo mechanism SV to change the motor capacity Vm, thereby controlling the speed.

When the moving angle of the motor moving member 35 is reduced, the motor capacity Vm becomes small and if the pump capacity Vp is fixed and the rotation speed Ni of the pump cam plate member 21 is fixed in the relationship of the above expression (1), the rotation of the transmission output shaft 6 is increased to a value close to the rotation speed Ni of the pump cam plate member 21, that is, continuously changed to the top gear. When the motor cam plate angle becomes zero, that is, upright, theoretically Ni=No (top gear ratio) which is a hydraulically locked state, the pump casing 20 turns together with the pump cylinder 22, the motor cylinder 32 and the transmission output shaft 6 to carry out mechanical power transmission.

As for control for changing the motor capacity continuously as described above, the motor moving member 35 is moved to change the motor cam plate angle. The motor servo mechanism SV for moving the motor moving member 35 will be described hereinbelow with reference to FIG. 10 mainly.

The motor servo mechanism SV has a ball screw shaft 41 which is positioned in the vicinity of the arm portion 35a of the motor moving member 35, extends parallel to the transmission output shaft 6 and is rotatably supported to the transmission housing HSG by bearings 40a and 40b and a ball nut 40 screwed to a male screw 41a formed on the outer wall of the ball screw shaft 41. A ball female screw is formed of a large number of balls arranged like a screw by a cage on the inner wall of the ball nut 40 and screwed to the male screw 41a. The ball nut 40 is connected to the arm portion 35a of the motor moving member 35 so that when the ball screw shaft 41 is driven to turn, the ball nut 40 is moved over the ball screw shaft 41 in left and right directions, thereby moving the motor moving member 35.

A cam plate control motor (electric motor) 47 is installed on the outer side of the transmission housing HSG to drive the ball screw shaft 41. An idle shaft 43 extends parallel to the drive shaft 46 of the cam plate control motor 47 and an idle gear member having gears 44 and 45 is rotatably mounted on the idle shaft 43. A gear 46a is formed at the end of the drive shaft 46 of the cam plate control motor 47 and engaged with the above gear 45. A gear 42 is connected to a shaft portion 41b projecting from the left side of the above ball screw shaft 41 in the left direction and engaged with the above gear 44.

Therefore, when the drive axis 46 is turned by driving the cam plate control motor 47, this rotation is transmitted to the gear 45, the gear 44 which turns together with the gear 45 and the gear 42 to drive the ball screw shaft 41. The ball nut 40 is moved in the right and left directions over the shaft 41 by the rotation of the ball screw shaft 41 to move the motor moving member 35. Since the rotation of the cam plate control motor 47 is transmitted to the ball screw shaft 41 by the gears 46a, 45, 44 and 42, the transmission ratio can be freely changed by suitably setting the gear ratio of these gears.

Figure 10:
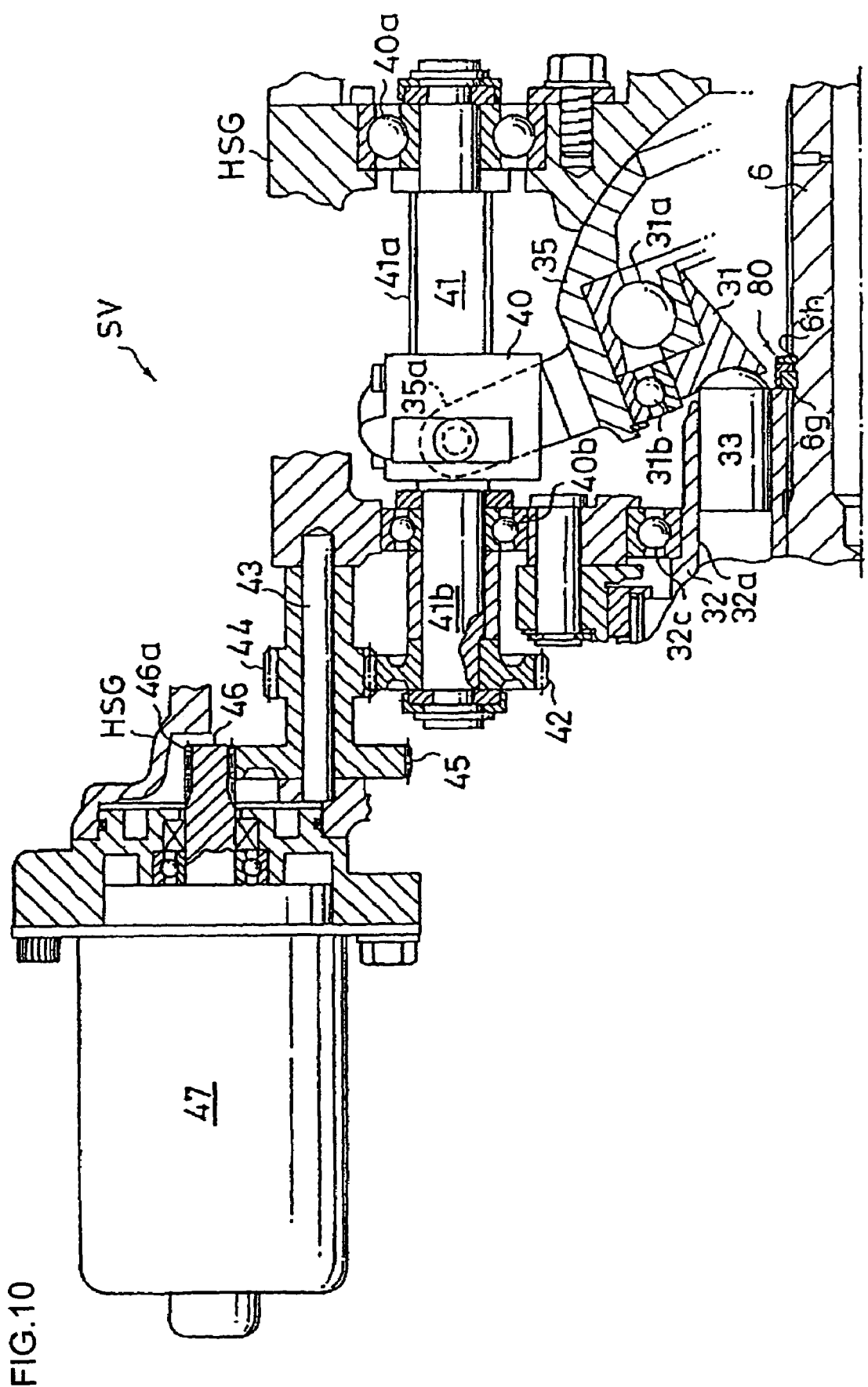
FIG. 10 is a sectional view of a motor servo mechanism in the above hydrostatic continuously variable transmission.

The cam plate control motor 47 is exposed to the outside in the vicinity of the rear side of the proximal end portion of the rear cylinder 1 of the V-type air cylinder engine E as shown in FIG. 2. The cylinder 1 is integratedly connected to the transmission housing HSG, and the cam plate control motor 47 is arranged in a space between the rear cylinder 1 and the transmission housing HSG. Thus, as the cam plate control motor 47 is arranged in the space between the rear cylinder 1 and the transmission housing HSG, this space can be effectively used and away from the shaft 130a of the swing arm 130 shown in FIG. 2, whereby the shape of the swing arm 130 is not restricted at all to eliminate interference between the cam plate control motor 47 and the swing arm 130. The cam plate control motor 47 can be protected from splashed water from below the body during driving, and rain water and dust from the forward direction. Further, the cam plate control motor 47 is arranged on the left side of the center CL in the horizontal direction of the body as shown in FIG. 10 and an air stream from the forward direction is applied to the cam plate control motor 47 efficiently to cool it effectively during driving.

In the hydrostatic continuously variable transmission CVT thus constituted, when the inner passage 56 and the outer passage 57 are communicated with each other, high pressure oil is not generated and power transmission between the hydraulic pump P and the hydraulic motor M can be cut off. That is, clutch control is made possible by controlling the communication opening between the inner passage 56 and the outer passage 57. A clutch device CL for carrying out this clutch control is provided in the hydrostatic continuously variable transmission CVT and will be described hereinbelow with reference to FIG. 11 to FIG. 14 as well.

This clutch device CL comprises a rotor 60 connected to the end portion of the pump casing 20 by a bolt 60b, weights 61 (balls or rollers) accepted in a plurality of accepting grooves 60a extending obliquely in the radial direction and formed in the inner wall of the rotor 60, a disk-like pressure receiver 62 having an arm portion 62a opposed to the accepting grooves, a spring 63 for urging the pressure receiver 62 so that the arm portion 62a presses the weights 61 into the accepting grooves 60a, and a valve spool 70 secured to a securing portion 62c at one end of the pressure receiver 62.

Figure 11:
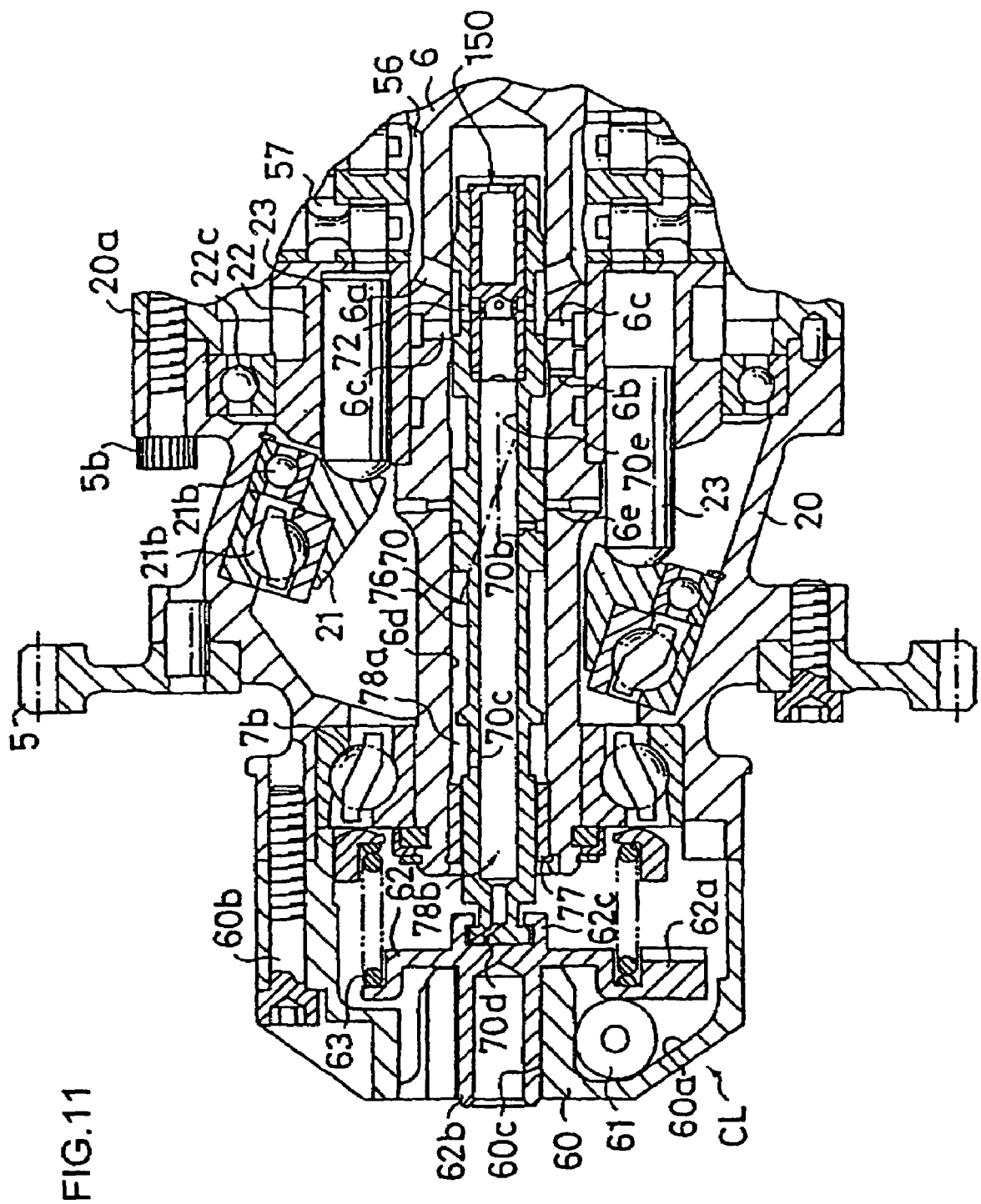
FIG. 11 is a sectional view showing the structures of a hydraulic pump and a clutch device in the above hydrostatic continuously variable transmission.

A through hole 60c is formed in the rotor 60 around the neutral axis of rotation, and the cylindrical portion 62b of the pressure receiver 62 is movably inserted into this through hole 60c so that the pressure receiver 62 can move in the axial direction. Therefore, when the pump casing 20 is at a standstill and the rotor 60 does not turn, the arm portion 62a presses the weights 61 into the accepting grooves 60a by the urging force of the spring 63 given to the pressure receiver 62. Since the accepting grooves 60a extend obliquely as shown in the figures, the weights 61 are pressed inward in the radial direction and the pressure receiver 62 is moved in the left direction as shown in FIG. 1 and FIG. 11.

When the pump casing 20 is driven to turn from this state and the rotor 60 turns, the weights 61 are forced outward in the radial direction in the accepting grooves 60a by centrifugal force. When the weights 61 are forced outward in the radial direction by centrifugal force, they are moved obliquely in the right direction along the accepting grooves 60a and push the arm portion 62a in the right direction, and the pressure receiver 62 is moved obliquely in the right direction in defiance of the urging force of the spring 63. The amount of movement in the right direction of the pressure receiver 62 changes according to centrifugal force applied to the weights 61, that is, the rotation speed of the pump casing 20. When the rotation speed is higher than a predetermined value, the pressure receiver 62 is moved to the position shown in FIG. 4. The valve spool 70 secured to the securing portion 62c of the pressure receiver 62 which moves right and left in the axial direction is fitted in the spool hole 6d extending in the axial direction, open to the end portion of the transmission output shaft 6 and moved right and left in the axial direction together with the pressure receiver 62.

As understood from this, the rotor 60, the weights 61 and the pressure receiver 62 constitute a governor mechanism for generating governor force in the axial direction corresponding to the input rotating speed of the hydraulic pump P by using centrifugal force applied to the weights 61 generated by the rotation of the pump casing 20.

An inner oil branch passage 6a connected to the spool hole 6d and diverging from the inner passage 56 and outer oil branch passages 6b and 6c connected to the spool hole 6d from the communication passage 57a and diverging from the outer passage 57 are formed in the transmission output shaft 6 having this spool hole 6d formed therein as shown in details in FIG. 5, FIG. 6 and FIGS. 11 to 14. FIG. 5 and FIG. 12 correspond to FIG. 1 and show that the valve spool 70 is moved left by the left movement of the pressure receiver 62. In this state, the inner oil branch passage 6a and the outer oil branch passage 6c communicate with each other through the right groove portion 72 of the valve spool 70 to connect the inner passage 56 to the outer passage 57. FIG. 6 and FIG. 14 correspond to FIG. 4 and show that the valve spool 70 is moved right by the right movement of the pressure receiver 62. In this state, communication between the inner oil branch passage 6a and the outer oil branch passage 6c is cut off by the center land portion 73 of the valve spool 70 to disconnect the inner passage 56 from the outer passage 57. FIG. 13 shows that the valve spool 70 is situated at an intermediate position.

Since the valve spool 70 is moved left when the pump casing 20 is at a standstill as described above, the inner oil branch passage 6a and the outer oil branch passage 6c communicate with each other to cut off power transmission between the hydraulic pump P and the hydraulic motor M, whereby the clutch is disconnected. When the pump casing 20 is driven to turn from this state, the pressure receiver 62 is moved right gradually by centrifugal force applied to the weights 61 in accordance with the rotating speed of the pump casing 20 and the valve spool 70 is moved right together. As a result, communication between the inner oil branch passage 6a and the outer oil branch passage 6c is cut off gradually by the central land portion 73 of the valve spool 70 and the clutch is gradually connected.

In the hydrostatic continuously variable transmission CVT according to this embodiment, when the pump casing 20 is driven to turn by the engine E and the engine speed is low (at the time of idling), the valve spool 70 is moved left and the clutch is disconnected. As the engine speed increases, the clutch is gradually connected.

The outer diameter d1 of the central land portion 73 is set smaller than the outer diameter d2 of the left land portion 74 of the valve spool 70. Therefore, when the valve spool 70 is moved right to connect the clutch, the oil pressure in the outer passage 57 applied to the left groove 75 of the valve spool 70 serves to move the valve spool 70 in the left direction. The pressure in the left direction corresponds to the size of oil pressure applied to the left groove 75 and a difference in pressure receiving area due to the difference between the above outer diameters d1 and d2. Although the difference in pressure receiving area is fixed, oil pressure applied to the left groove 75 is oil pressure in the outer passage 57 and changes according to drive force. As drive force increases, the oil pressure becomes higher. This constitution corresponds to oil pressure providing means specified in claims.

As understood from this, the connection control of the clutch by the movement of the valve spool 70 is carried out in accordance with balance (Fgov=Fp+Fspg) among governor force (Fgov) generated by centrifugal force applied to the weights 61 based on the rotation speed of the pump casing 20, the urging force (Fspg) of the spring 63 and the pressure (Fp) of oil applied to the left groove 75 of the above valve spool 70. Stated more specifically, as the rotation speed of the pump casing 20 increases, the control of connecting the clutch is carried out and as the pressure of oil in the outer passage 57 rises (drive force transmitted from the hydraulic pump P to the hydraulic motor M increases), force in the direction of disconnecting the clutch is applied.

The state of the intermediate stage of the control of connecting and disconnecting the clutch, that is, the semi-clutch state is shown in FIG. 13. In this state, the right end 73a of the central land portion 73 of the valve spool 70 slightly communicates with the outer oil branch passage 6b with the result that the inner passage 56 and the outer passage 57 partially communicate with each other, that is, a semi-clutch state is obtained. Although the inner passage 56 and the outer passage 57 are connected or disconnected by the slight movement in the axial direction of the valve spool 70 in this semi-clutch state, as the movement in the axial direction of the valve spool 70 is changed by balance among the governor force (Fgov), urging force and the pressure of oil as described above, when the pressure of oil rises abruptly by the quick operation of the throttle, the valve spool 70 works to disconnect the clutch and the inner passage 56 and the outer passage 57 are connected and disconnected repeatedly, whereby it is difficult to transmit power stably.

Therefore, to stabilize the clutch performance by preventing the valve spool 70 from moving responsively, a buffer mechanism is provided. This buffer mechanism will be described with reference to FIG. 1, FIG. 4 and FIG. 11. As shown in these figures, a variable oil chamber forming groove 76 is formed on the left side of the left land portion 74 of the valve spool 70 and a guide land portion 71 having a smaller diameter than the left land portion 74 is formed on the left side of the variable oil chamber forming groove 76. The guide land portion 71 is fitted in the guide member 77 at the left end of the spool hole 6d to form a variable oil chamber 78a surrounded by the spool hole 6d, the guide member 77 and the left land portion 74 above the variable oil chamber forming groove 76.

Further, an oil pool forming hole 70e extending in the axial direction is formed in the valve spool 70, a modulator valve 150 is placed at the open right end portion of the oil pool forming hole 70e, and an orifice 70d is formed in the closed left end portion of the oil pool forming hole 70e. As a result, the oil pool forming hole 70e is closed by the modulator valve 150 to form an oil pool chamber 78b. A communication hole 70c is formed in the valve spool 70 to connect the variable oil chamber forming groove 76 to the oil pool forming hole 70e so that the variable oil chamber 78a and the oil pool chamber 78b communicate with each other through the communication hole 70c.

Thus, the variable oil chamber 78a and the oil pool chamber 78b which communicate with each other through the communication hole 70c constitute the buffer mechanism and its operation will be described hereinunder. When the valve spool 70 is moved left in the axial direction, as the guide member 77 is fixed and held in the spool hole 6d, the inside capacity of the variable oil chamber 78a becomes small and working oil in the oil chamber is compressed by the left land portion 74. Since the inside capacity of the oil pool chamber 78b cannot be changed at this point, the movement of the valve spool 70 is controlled to become slow by this compression force as resistance. When the valve spool 70 is moved right in the axial direction, though the inside capacity of the variable oil chamber 78*a* increases, resistance to force for increasing the capacity is achieved by using a communication hole 70*c* whose diameter is sufficiently small, and the flow restriction sufficiently great, so that the movement of the valve spool 70 is controlled to become sufficiently slow.

Although the left end of the oil pool forming hole 70*e* is closed, as the orifice hole 70*d* is formed, oil flows through the orifice hole 70*d*, thereby adjusting the size of the above resistance by this orifice hole 70*d*. This orifice hole 70*d* is open to a securing connection portion between the securing portion 62*c* of the pressure receiver 62 and the left end of the valve spool 70 to lubricate the securing connection portion with oil discharged through the orifice hole 70*d*.

In the buffer mechanism thus constituted, to fill working oil into the variable oil chamber 78*a* and the oil pool chamber 78*b*, the modulator valve 150 is installed and will be described with reference to FIGS. 12 to 14 as well. A communication hole 70*a* communicating with the modulator valve 150 is formed in the right groove 72 in the valve spool 70 so that working oil in the right groove 72 flows into the modulator valve 150 through the communication hole 70*a*. The modulator valve 150 is a so-called "pressure reducing valve" and supplies working oil in the right groove 72 into the oil pool chamber 78*b* so as to maintain the pressure of oil in the oil pool chamber 78*b* at a predetermined low pressure set by the modulator valve 150. Therefore, the variable oil chamber 78*a* and the oil pool chamber 78*b* are always filled with working oil having a predetermined low pressure set by the modulator valve 150.

Since oil in the oil pool chamber 78*b* is always discharged through the orifice hole 70*d*, the amount of oil equal to the amount of oil discharged is supplied by the modulator valve 150. The oil for replenishment is oil contained in the right groove 72. Since the right groove 72 communicates with the low pressure side oil passage 56 and the high pressure side oil passage 57 in accordance with the connection state of the clutch, working oil in the low pressure side oil passage 56 and the high pressure side oil passage 57, that is, working oil in the hydraulic closed circuit is used as the oil for replenishment. Therefore, working oil in the hydraulic closed circuit is discharged in an amount equal to the amount of oil for replenishment and exchanged with fresh working oil (this working oil exchange system will be described hereinafter), thereby making it possible to prevent the temperature of working oil in the closed circuit from rising.

Further, an exhaust hole 70*b* extending from the oil pool chamber 78*b* (oil pool chamber forming hole 70*e*) to the outer wall of the left land portion 74 is formed in the valve spool 70, and an exhaust hole 6*e* extending from the spool hole 6*d* to the outside is formed in the transmission output shaft 6. When the valve spool 70 is moved to a semi-clutch state position as shown in FIG. 13, these exhaust holes 70*b* and 6*e* communicate with each other through the outer groove 70*f* of the valve spool 70. As a result, in the semi-clutch state, working oil in the oil pool chamber 78*b* is discharged to the outside through the exhaust holes 70*b* and 6*e*.

Since the inner passage 56 and the outer passage 57 partially communicate with each other in the semi-clutch state and working oil flows from the high pressure side oil passage to the low pressure side oil passage through this communication portion in the hydraulic closed circuit, the temperature of the working oil in the hydraulic closed circuit easily rises. However, when working oil in the oil pool chamber 78*b* is discharged to the outside through the exhaust holes 70*b* and 6*e* in this semi-clutch state, the amount of working oil equal to the above amount of working oil discharged is supplied by the modulator valve 150. Since this oil is oil in the right groove 72 which communicates with the low pressure side oil passage 56 and the high pressure side oil passage 57 in accordance with the connection state of the clutch, working oil in the low pressure side oil passage 56 and the high pressure side oil passage 57, that is, working oil in the hydraulic closed circuit is used as the oil for replenishment. Therefore, working oil in the hydraulic closed circuit is always discharged in an amount equal to the amount of working oil for replenishment and exchanged with fresh working oil (this working oil exchange system will be described hereinafter), thereby making it possible to effectively prevent the temperature of the working oil in the closed circuit from rising in the semi-clutch state especially.

The hydrostatic continuously variable transmission CVT thus constituted is provided with the lock-up mechanism 90 for closing the hydraulic closed circuit to obtain a lock-up state when the change gear ratio becomes 1.0, that is, the input rotation of the hydraulic pump P becomes the same as the output rotation of the hydraulic motor M. This lock-up mechanism 90 will be described hereinbelow with reference to FIGS. 15 to 17. The lock-up mechanism 90 has the motor eccentric member 91 in slide contact with the end of the motor casing 30*a* as described above. The motor eccentric member 91 is formed like a ring as a whole, and the motor side cam ring 54 is mounted on the inner wall 91*a*. A securing portion 91*a* is formed at the upper end of the motor eccentric member 91 and pivotably connected to the motor casing 30*a* by a securing pin 92, and the motor eccentric member 91 can be moved round the securing pin 92 relative to the motor casing 30*a*.

To move the motor eccentric member 91, a lock-up actuator LA is mounted to the motor casing 30*b* and located below the motor eccentric member 91. This lock-up actuator LA comprises a cylinder 96 fixed to the motor casing 30*b*, a piston 94 which is slidably installed in the cylinder hole of the cylinder 96, a cover member 95 attached to the cylinder 96 to cover the cylinder hole, and a spring 97 for urging the piston 94 toward the cover member 95. The inside space of the cylinder hole is divided into two by the piston 94 to form a lock-up working oil chamber 96*a* and a lock-up release chamber 96*b*. The spring 97 is installed in the lock-up release chamber 96*b*. The end of the piston 94 projects outward from the cylinder 96 and the projection portion 94*a* is pivotably connected to a connection portion 91*b* formed under the motor eccentric member 91 by a connection pin 93.

Figure 16:
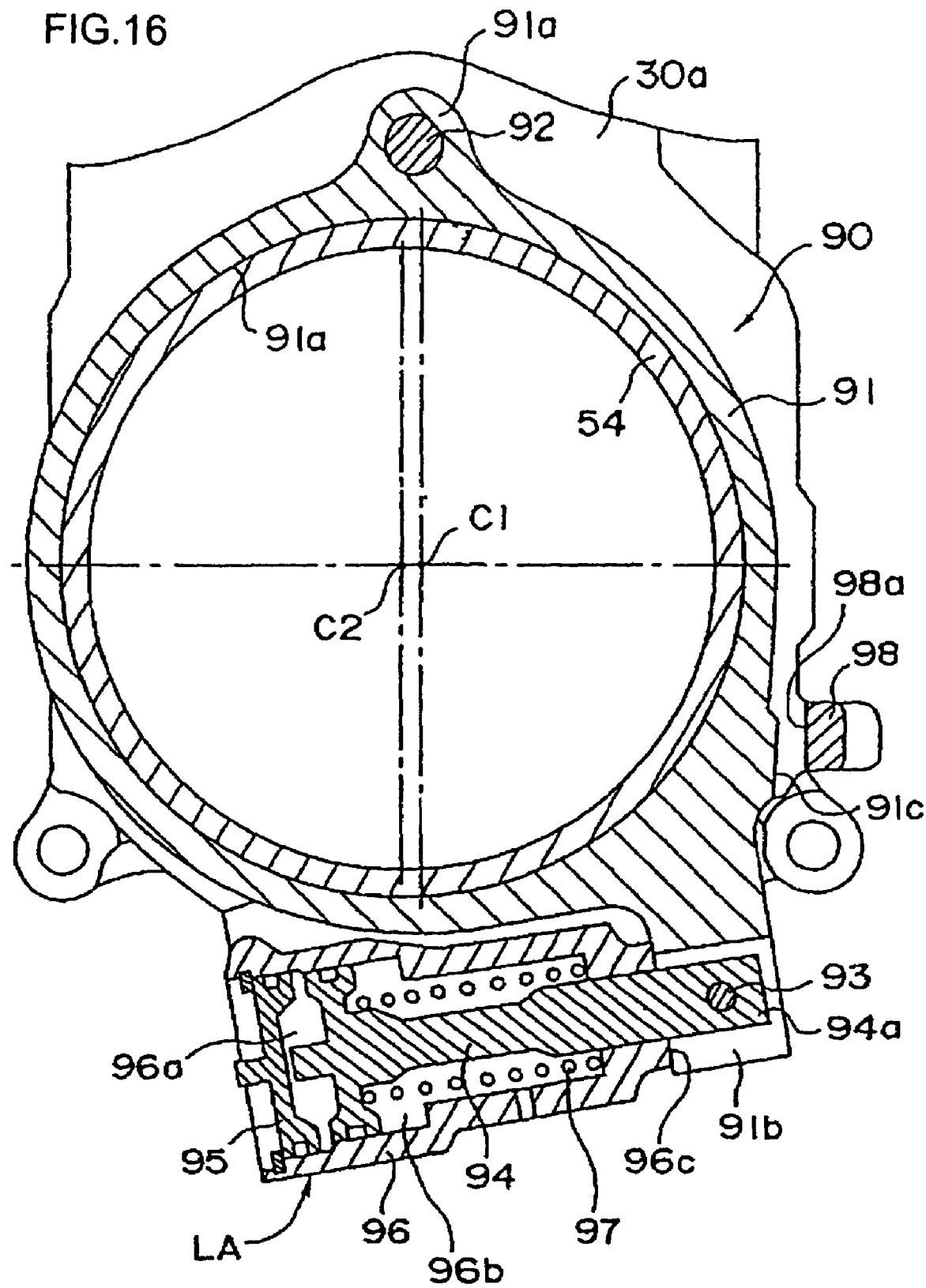
FIG. 16 is a sectional view cut on an arrow Y—Y in FIG. 15 of the structure of the above lock-up mechanism when it is at a normal position.

In the lock-up mechanism 90 thus constituted, when the pressure of oil in the lock-up working oil chamber 96*a* is released, the piston 94 is moved toward the cover member 95 by the urging force of the spring 97 in the lock-up release chamber 96*b*. As shown in FIG. 16, the connection portion 91*b* comes into contact with the outer end face 96*c* of the cylinder 96 at this point and the center C2 of the inner wall 91*a* of the motor eccentric member 91 becomes eccentric from the center C1 of the output rotor (motor cylinder 32) and the transmission output shaft 6, and the motor eccentric member 91 is moved to the normal position.

Figure 17:
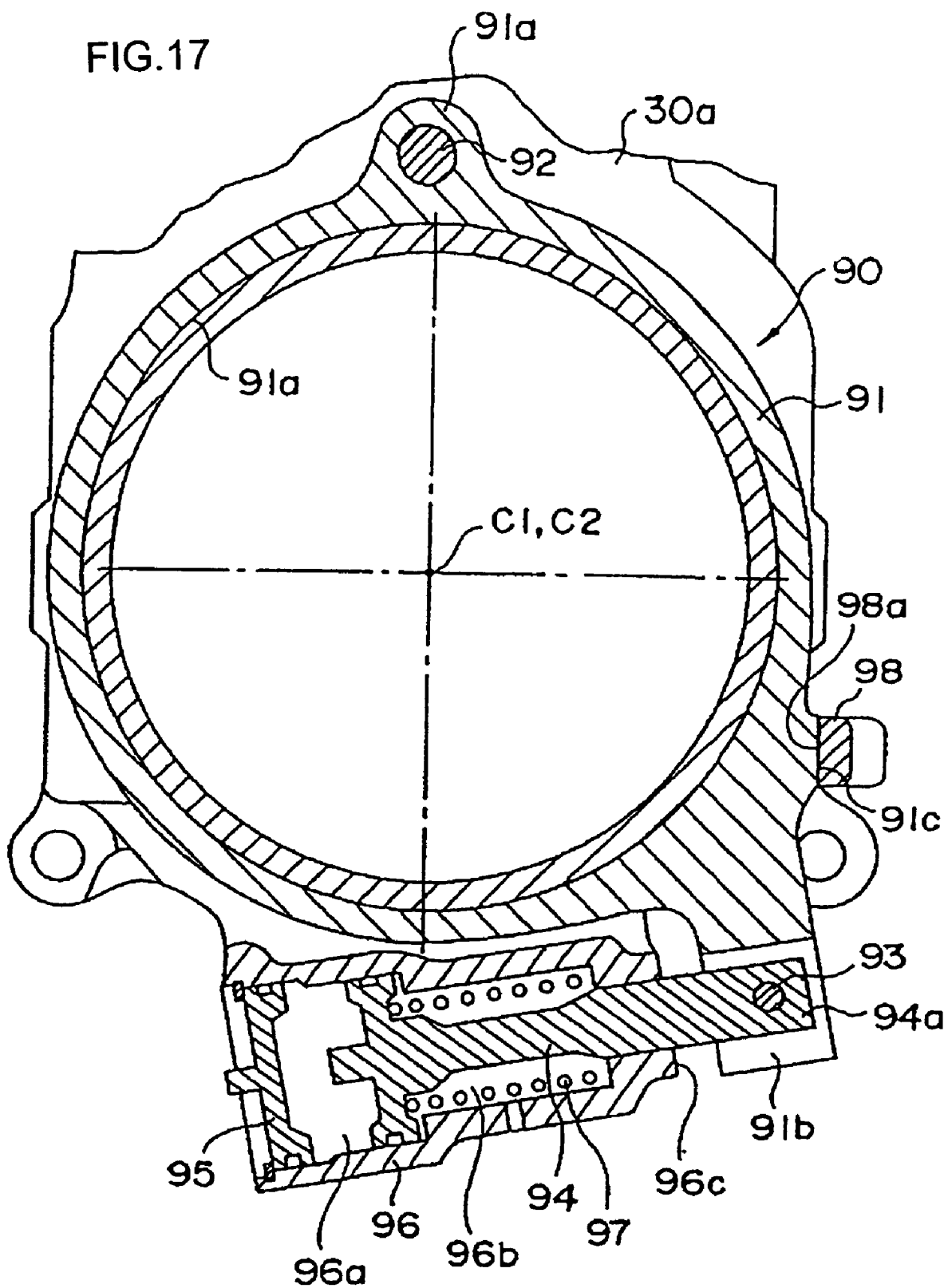
FIG. 17 is a sectional view cut on the arrow Y—Y in FIG. 15 of the structure of the above lock-up mechanism when it is at a lock-up position.

When the lock-up working oil is supplied into the lock-up working chamber 96*a*, the piston 94 is moved in the right direction in the figures in defiance of the pressure of this oil, and the projection portion 94*a* is further projected. Thereby, the motor eccentric member 91 is turned counterclockwise in the figures with the securing pin 95 as the center and a contact face 91c formed on the flank of the motor eccentric member 91 comes into contact with the contact face 98a of a positioning projection 98 formed integrated with the motor casing 30a as shown in FIG. 17. In this state, the center C2 of the inner wall 91a of the motor eccentric member 91 overlaps with the center C1 of the output rotor (motor cylinder 32) and the transmission output shaft 6, and the motor eccentric member 91 is moved to the lock-up position.

As understood from the constitution of the hydraulic motor M and the constitution of the distribution valve 50 which have been described above, when the motor eccentric member 91 is moved to the lock-up position, the center of the motor side cam ring 54 provided on the inner wall 91a of the motor eccentric member 91 is aligned with the center of rotation of the motor cylinder 32, the motor side spools 55 are not reciprocated and the supply of the high pressure oil to the motor plunger is cut off even if the motor cylinder 32 turns. At this point, the low pressure side oil passage 56 and the high pressure side oil passage 57 communicate with each other. As a result, the compression loss and the leakage of working oil of the motor plungers 33, the mechanical power loss of the bearings or the like caused by a failure to apply a high pressure to the motor plungers 33 and the sliding resistance of the pump side spools 53 can be reduced, thereby improving power transmission efficiency.

Figure 18:
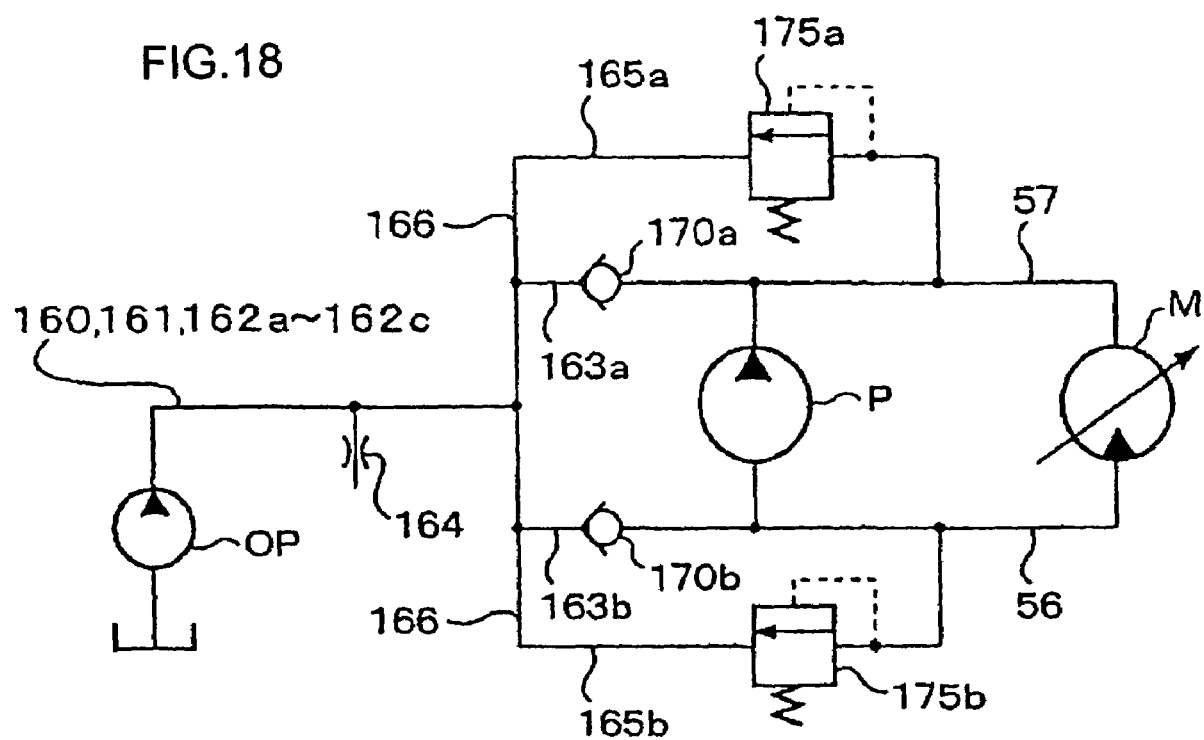
FIG. 18 is a diagram of a hydraulic circuit showing the constitution of oil passages of the above hydrostatic continuously variable transmission.

A description is subsequently given of the system for replenishing the hydraulic closed circuit with working oil with reference to FIGS. 12 to 14 and FIG. 18. As shown in FIG. 18, the supply of working oil is carried out by the oil pump OP (see FIG. 3). Oil discharged from the oil pump OP driven by the engine E is supplied into an oil passage 160 formed in the transmission output shaft 6 in the axial direction through an oil passage in the transmission housing HSG. The oil passage 160 is connected to an oil passage 161 which is formed in the transmission output shaft 6 in the radial direction and open to the outer surface of the shaft 6 at the end. The oil passage 161 is connected to oil passages 162a, 162b and 162c formed in the output rotor (motor cylinder 32, valve body 51 and pump cylinder 22) in the axial direction, an orifice 164 communicating with the outside is formed at the end of the oil passage 162c, and working oil flowing to the outside from the orifice 164 lubricates the inside of the transmission.

In the pump cylinder 22, there are installed a first check valve 170a for supplying oil into the outer passage 57 and a first relief valve 175a for relieving working oil when the pressure of oil in the outer passage 57 exceeds a predetermined high pressure as shown in FIGS. 12 to 14. Not shown in FIGS. 12 to 14, there are further installed a second check valve 170b for supplying oil into the inner passage 56 and a second relief valve 175b for relieving working oil when the pressure of oil in the outer passage 57 exceeds a predetermined high pressure, both of which are the same in constitution as the first check valve 170a and the first relief valve 175a, respectively.

As shown in these figures, an oil passage 163a for linking the oil passage 162c to the first check valve 170a is formed in the pump cylinder 22 so as to supply working oil from the oil pump OP to the outer passage 57 through the first check valve 170a as required (according to a leak from the hydraulic closed circuit). The plural oil passages 162a, 162b and 162c are formed, and an oil passage 163b for linking the oil passage 162c to the second check valve 170b is formed in the pump cylinder 22 so as to supply working oil from the oil pump OP to the inner passage 56 through the second check valve 170b as required (according to a leak from the hydraulic closed circuit).

Working oil relieved from the first relief valve 175a when the pressure of oil in the outer passage 57 exceeds a predetermined high pressure set by the urging means is discharged into a return oil passage 165a formed in the pump cylinder 22. This return oil passage 165a communicates with a ring oil passage 166 which is formed like a ring in the outer surface of the transmission output shaft 6 and surrounded by the pump cylinder 22 when the transmission output shaft 6 is mated with the pump cylinder 22. This oil passage 166 communicates with the oil passage 162c through the oil passage 163a. As understood from this, working oil relieved from the first relief valve 175a is discharged into an oil passage for supplying oil for replenishment from the oil pump OP. Not shown, working oil relieved from the second relief valve 175b is also discharged into the oil passage 162c, that is, an oil passage for supplying oil for replenishment from the return oil passage 165b through the ring oil passage 166 and the oil passage 163b.

Working oil relieved from the first and second relief valves 175a and 175b is discharged into the oil passage 162c for supplying oil for replenishment through the return oil passages 165a and 165b. Since the relieved oil is not returned into the hydraulic closed circuit, it is possible to prevent a rise in the temperature of oil in the hydraulic closed circuit. Since the oil pressure in the oil passage 162a for supplying oil for replenishment is kept stable, working oil in the high pressure side oil passage can be relieved efficiently.

The oil passage for supplying oil for replenishment extends from the transmission output shaft 6 into the output rotor, the first and second relief valves 175a and 175b and the return oil passages 165a and 165b are formed in the pump cylinder 22 (output rotor), and the return oil passages 165a and 165b are connected to the oil passage 162c for supplying oil for replenishment in the pump cylinder 22. Therefore, the return oil passages 165a and 165b can be made short, and the high pressure relief structure can be stored compact in the pump cylinder 22. The return oil passages 165a and 165b are connected to the oil passage 162c (and 163a and 163b) for supplying oil for replenishment through the rig oil passage 166 which is formed at the mating portion with the pump cylinder 22 in the outer wall of the transmission output shaft 6 and extends in the circumferential direction. The oil passage connection structure of this portion is simple.

While the continuously variable transmission of the present invention is applied in a motorcycle in this embodiment, the present invention is not applied only to the above motorcycle and may be applied to various power transmission structures such as vehicles including four-wheeled vehicles and automobiles and general-purpose machines.

The above specification, examples and data provide a complete description of the manufacture and use of the composition of the invention. Since many embodiments of the invention can be made without departing from the spirit and scope of the invention, the invention resides in the claims hereinafter appended.

We claim:
1. A hydrostatic continuously variable transmission comprising:
    a fluid pump and a fluid motor linked together in a closed circuit, wherein the capacity of at least one of the pump or the motor is variable to enable control of the relative rotational speeds of a pump input and a motor output, wherein the pump is a hydraulic pump, the motor is a hydraulic motor, and the fluid is a hydraulic fluid, a clutch device for engaging or disengaging force transmission between the pump and the motor, the clutch comprising:
  a clutch valve that can be opened to connect a high pressure fluid passage with a low pressure fluid passage of the closed circuit, or closed to disconnect the high pressure fluid passage from the low pressure fluid passage of the closed circuit;
  a mechanism constructed to generate a force in a closing direction of the clutch valve in response to the rotational speed of the pump input, wherein the mechanism constructed to generate a force in the closing direction is actuated by centrifugal force generated by the input rotation;
  a mechanism constructed to dampen the opening and closing of the clutch valve,
  wherein the clutch valve includes a valve spool that is movably arranged in a spool hole formed in the axial direction of a support shaft.

2. The transmission according to claim 1, wherein the pump is of a fixed capacity type having a predetermined cam plate angle, and the motor is of a variable capacity type having a variable cam plate angle and a motor servo mechanism for changing the angle of the motor cam plate.

3. The transmission according to claim 1, wherein the transmission further comprises a lock-out mechanism for maintaining a constant relative rotational speed of a pump input and a motor output.

4. The transmission according to claim 1, wherein the mechanism includes weights that displace radially outward for applying a force in the closing direction of the clutch valve.

5. The transmission according to claim 1, wherein the mechanism constructed to apply a force in the opening direction includes a spring.

6. The transmission according to claim 1, wherein the mechanism constructed to dampen the opening and closing of the clutch valve includes:
  a variable hydraulic chamber; and
  an oil pool chamber, the oil pool chamber being in fluid communication with the variable hydraulic chamber such that the movement of the clutch valve is dampened by the resistance due to fluid flow between the variable hydraulic chamber and the oil pool chamber.

7. The transmission according to claim 6, wherein the dampening effect is increased or decreased according to a restriction of a fluid flow between the variable hydraulic chamber and the oil pool chamber.

8. A clutch device for a hydrostatic continuously variable transmission, the hydrostatic continuously variable transmission being constituted such that a hydraulic pump and a hydraulic motor are linked together by a hydraulic closed circuit, and the capacity of at least one of the hydraulic pump or the hydraulic motor is controlled to change the ratio of an input rotation of the hydraulic pump and an output rotation of the hydraulic motor,
  the clutch device comprising:
    a clutch valve for connecting and disconnecting a high pressure side oil passage and a low pressure side oil passage which constitute a part of the hydraulic closed circuit, to control the transmission of rotation from the hydraulic pump to the hydraulic motor;
    a governor mechanism for generating governor force corresponding to the input rotation speed of the hydraulic pump, wherein centrifugal force generated by the input rotation of the hydraulic pump is used by the governor to apply a force in the closing direction of the clutch valve;
    urging means for applying an urging force in the opening direction of the clutch valve; and
    a buffer mechanism for easing the opening and closing movements of the clutch valve activated according to the governor force and the urging force,
    wherein the clutch valve includes a valve spool that is movably arranged in a spool hole formed in the axial direction of a support shaft.

9. A clutch device for a hydrostatic continuously variable transmission, the hydrostatic continuously variable transmission being constituted such that a hydraulic pump and a hydraulic motor are linked together by a hydraulic closed circuit, and the capacity of at least one of the hydraulic pump or the hydraulic motor is controlled to change the ratio of an input rotation of the hydraulic pump and an output rotation of the hydraulic motor,
  the clutch device comprising:
    a clutch valve for connecting and disconnecting a high pressure side oil passage and a low pressure side oil passage which constitute a part of the hydraulic closed circuit, to control the transmission of rotation from the hydraulic pump to the hydraulic motor;
    a governor mechanism for generating governor force corresponding to the input rotation speed of the hydraulic pump, wherein centrifugal force generated by the input rotation of the hydraulic pump is used by the governor to apply a force in the closing direction of the clutch valve;
    urging means for applying an urging force in the opening direction of the clutch valve; and
    a buffer mechanism for easing the opening and closing movements of the clutch valve activated according to the governor force and the urging force,
    wherein the clutch valve includes a valve spool that is movably arranged in a spool hole formed in the axial direction of a support shaft, the shaft being constructed to rotatably support the hydraulic pump and the hydraulic motor, the valve spool arranged in the spool hole such that the high pressure side oil passage and the low pressure side oil passage are connected or disconnected according to the movement of the valve spool in the spool hole; and
    wherein the buffer mechanism has a variable oil chamber which is surrounded by the inner wall of the spool hole and the outer wall of the valve spool and whose capacity is changed by the movement of the valve spool and an oil pool chamber which is connected to the variable oil chamber and formed in the valve spool.

10. The clutch device according to claim 9, wherein an oil passage having an orifice connected to the oil pool chamber is formed in the valve spool for discharging oil from the variable oil chamber to the oil pool chamber to provide resistance to a change in the capacity of the variable oil chamber and to ease the movement of the valve spool.

11. The clutch device according to claim 10, wherein the oil passage is formed in the valve spool so as to be open to a connection portion for connecting the governor mechanism with the valve spool.

12. A hydrostatic continuously variable transmission comprising:
  a fluid pump and a fluid motor linked together in a closed circuit, wherein the capacity of at least one of the pump or the motor is variable to enable control of the relative rotational speeds of a pump input and a motor output, a clutch device for engaging or disengaging force transmission between the pump and the motor, the clutch comprising:
  a clutch valve that can be open to connect a high pressure fluid passage with a low pressure fluid passage of the closed circuit or closed to disconnect the high pressure fluid passage from the low pressure fluid passage of the closed circuit;
  a means for generating a force in a closing direction of the clutch valve in response to the rotational speed of the pump input,
  a means for dampening the opening end closing of the clutch valve,
  wherein the clutch valve includes a valve spool that is movably arranged in a spool hole formed in the axial direction of a support shaft.

* * * * *